US012736358B2

(12) United States Patent
Hamada

(10) Patent No.: US 12,736,358 B2
(45) Date of Patent: Sep. 15, 2026

(54) INFORMATION PROCESSING METHOD, INFORMATION PROCESSING DEVICE, AND NON-TRANSITORY COMPUTER READABLE RECORDING MEDIUM STORING INFORMATION PROCESSING PROGRAM

(71) Applicant: Panasonic Intellectual Property Corporation of America, Torrance, CA (US)

(72) Inventor: Shinichiro Hamada, Osaka (JP)

(73) Assignee: Panasonic Intellectual Property Corporation of America, Torrance, CA (US)

(*) Notice: Subject to any disclaimer, the term of this patent is extended or adjusted under 35 U.S.C. 154(b) by 383 days.

(21) Appl. No.: 18/222,869

(22) Filed: Jul. 17, 2023

(65) Prior Publication Data

US 2023/0375350 A1 Nov. 23, 2023

Related U.S. Application Data

(63) Continuation of application No. PCT/JP2021/041405, filed on Nov. 10, 2021.

(30) Foreign Application Priority Data

Jan. 22, 2021 (JP) ................................. 2021-008576

(51) Int. Cl.
*G01C 21/34* (2006.01)
*G08G 1/123* (2006.01)

(52) U.S. Cl.
CPC ......... *G01C 21/3453* (2013.01); *G08G 1/123* (2013.01)

(58) Field of Classification Search
None
See application file for complete search history.

(56) References Cited

U.S. PATENT DOCUMENTS 11,320,280 B2 * 5/2022 Gupta .................... G06V 20/56
11,971,716 B2 * 4/2024 Herbach ......... B60W 60/00253
(Continued)

FOREIGN PATENT DOCUMENTS

CN 111480174 A 7/2020
JP 2012189438 A * 10/2012
(Continued)

OTHER PUBLICATIONS

JP2012189438A—Description Translation Title: Route Guidance System and On-Vehicle Navigation Device Author: Kimura Tatsu; Suzuki Takamitsu; Kodan Tomonori; Hirate Morihiro Date: 0/Apr. 2012 (Year: 2012).*
(Continued)

*Primary Examiner* — Khoi H Tran
*Assistant Examiner* — Trang Dang
(74) *Attorney, Agent, or Firm* — GREENBLUM & BERNSTEIN, P.L.C.

(57) ABSTRACT

A server acquires a waiting place of a passenger, a destination place of the passenger, and environmental information indicating environment of the waiting place; calculates an environmental nonconformity value indicating an index of a discomfort level of environment at the waiting place for the passenger based on the environmental information on the waiting place; calculates a transportation route of a mobile body to minimize a sum of a waiting time of the passenger at the waiting place, the waiting time being weighted using the environmental nonconformity value, and a moving time of the passenger to move from the waiting place at which the passenger rides on the mobile body to the destination place; and outputs information indicating the transportation route.

8 Claims, 20 Drawing Sheets

(56) References Cited

U.S. PATENT DOCUMENTS

| | | | | |
|---|---|---|---|---|
| 2019/0187702 | A1 | 6/2019 | Herbach et al. | |
| 2020/0166935 | A1 | 5/2020 | Herbach et al. | |
| 2021/0088341 | A1* | 3/2021 | Macneille | G06Q 10/02 |
| 2021/0140777 | A1* | 5/2021 | Balva | G01C 21/3484 |
| 2022/0121204 | A1 | 4/2022 | Herbach et al. | |
| 2022/0178709 | A1* | 6/2022 | Nakajima | G01C 21/3438 |

FOREIGN PATENT DOCUMENTS

| | | | | |
|---|---|---|---|---|
| JP | 2013206282 | A | * | 10/2013 |
| WO | WO 2019/203788 | A1 | | 10/2019 |

OTHER PUBLICATIONS

JP2013206282A—Description Translation Title: Transfer Route Search Device, Transfer Route Search Method and Portable Terminal Author: Masuoka Takanori; Toda Masafumi Date: Oct. 7, 2013 (Year: 2013).*
JP2013206282A—Description Translation (Year: 2013).*
JP-2013206282-A Description Translation (Year: 2026).*
Bodin et al., “The Multi-Vehicle Subscriber Dial-A-Ride Problem”, Naval Postgraduate School, Feb. 1983.
Dijkstra, “A Note on Two Problems in Connexion with Graphs”, Numerische Mathematik, vol. 1, Jun. 1959, pp. 269-271.
Masuda et al., “Application of Local Search Method to Vehicle Routing Problem with Time Window Constraints”, Kokyuroku document at the Research Institute for Mathematical Sciences, vol. 1114, 1999, pp. 194-205.
Malandraki et al., “Time Dependent Vehicle Routing Problems: Formulations, Properties and Heuristic Algorithms”, Transportation Science, vol. 26, No. 3, Aug. 1992, pp. 185-200.
International Search Report issued in International Patent Application No. PCT/JP2021/041405, dated Dec. 21, 2021, along with an English translation thereof.

* cited by examiner

| | WAITING PLACE | DESTINATION PLACE | ARRIVAL TIME AT WAITING PLACE |
|---|---|---|---|
| PASSENGER U1 | PLACE P1 | PLACE P3 | 10:00 |
| PASSENGER U2 | PLACE P2 | PLACE P4 | 10:20 |

FIG.4

| | TEMPERATURE | WEATHER | PM2.5 CONCENTRATION |
|---|---|---|---|
| PLACE P1 | 1.2 | RAINY | 2.4 |
| PLACE P2 | 1.2 | CLOUDY | 3.2 |

FIG.5

| | ENVIRONMENTAL NONCONFORMITY VALUE |
|---|---|
| PLACE P1 | 1.4 |
| PLACE P2 | 1.2 |

FIG.6

| | PLACE P1 | PLACE P2 | PLACE P3 | PLACE P4 | CURRENT POSITION OF ON-DEMAND VEHICLE D1 | CURRENT POSITION OF ON-DEMAND VEHICLE D2 |
|---|---|---|---|---|---|---|
| PLACE P1 | | 1.5 | 2.4 | 1.3 | 0.5 | 1.7 |
| PLACE P2 | 1.2 | | 3.2 | 2.1 | 2.0 | 0.5 |
| PLACE P3 | 2.1 | 3.4 | | 1.5 | 3.0 | 3.7 |
| PLACE P4 | 1.3 | 2.4 | 2.4 | | 1.8 | 2.6 |
| CURRENT POSITION OF ON-DEMAND VEHICLE D1 | 0.5 | 2.0 | 3.0 | 1.8 | | 1.2 |
| CURRENT POSITION OF ON-DEMAND VEHICLE D2 | 1.7 | 0.5 | 3.7 | 2.6 | 1.2 | |

| | TEMPERATURE | WEATHER | PM2.5 CONCENTRATION |
|---|---|---|---|
| PLACE P1 | 1.2 | RAINY | 2.4 |
| PLACE P2 | 1.2 | CLOUDY | 3.2 |

| | ENVIRONMENTAL NONCONFORMITY VALUE |
|---|---|
| PLACE P1 | 1.4 |
| PLACE P2 | 1.2 |

| | PLACE P1 | PLACE P2 | PLACE P3 | PLACE P4 | CURRENT POSITION OF ON-DEMAND VEHICLE D1 | CURRENT POSITION OF ON-DEMAND VEHICLE D2 |
|---|---|---|---|---|---|---|
| PLACE P1 | | 1.5 | 2.4 | 1.3 | 0.5 | 1.7 |
| PLACE P2 | 1.2 | | 3.2 | 2.1 | 2.0 | 0.5 |
| PLACE P3 | 2.1 | 3.4 | | 1.5 | 3.0 | 3.7 |
| PLACE P4 | 1.3 | 2.4 | 2.4 | | 1.8 | 2.6 |
| CURRENT POSITION OF ON-DEMAND VEHICLE D1 | 0.5 | 2.0 | 3.0 | 1.8 | | 1.2 |
| CURRENT POSITION OF ON-DEMAND VEHICLE D2 | 1.7 | 0.5 | 3.7 | 2.6 | 1.2 | |

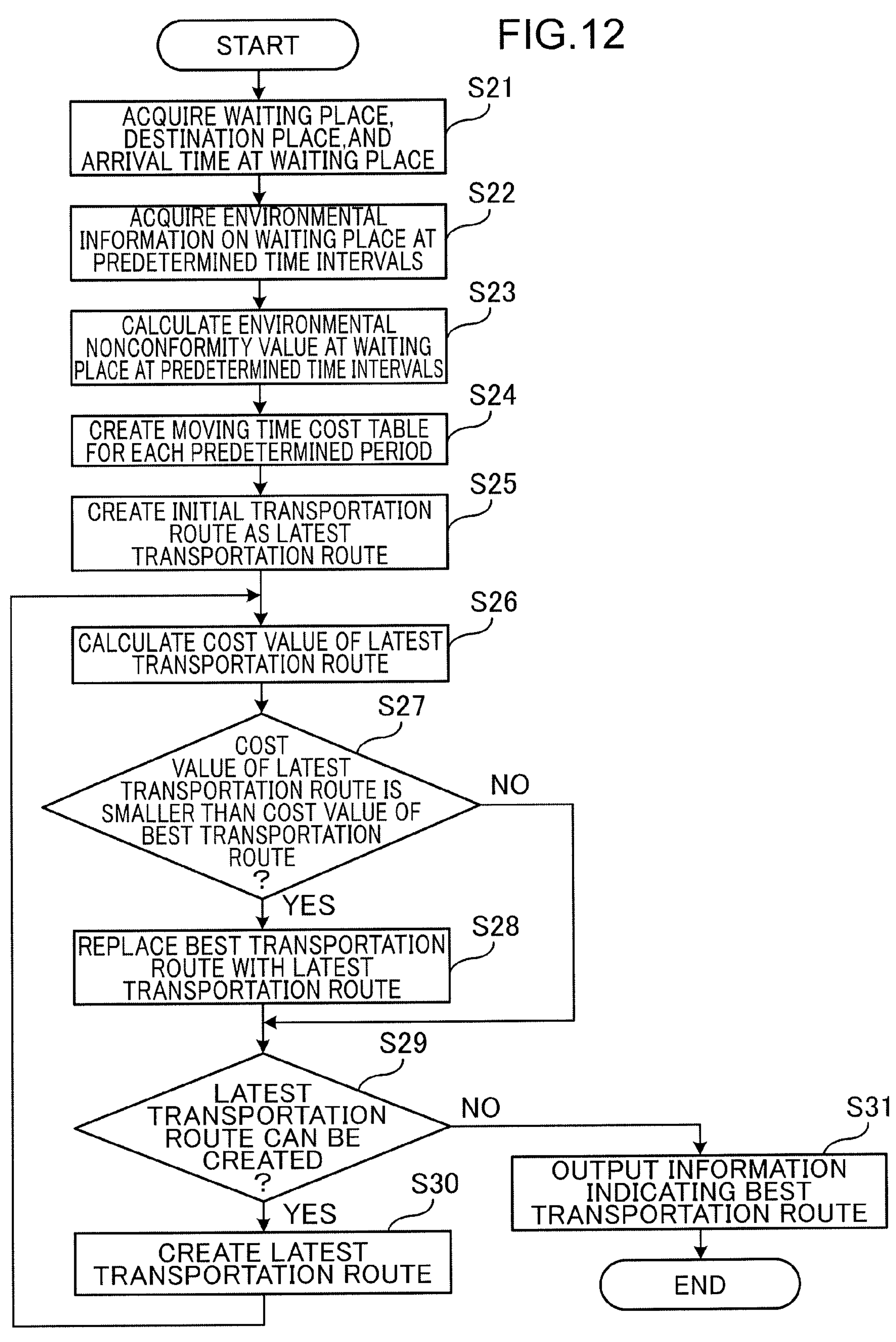
FIG.12
START
S21
ACQUIRE WAITING PLACE, DESTINATION PLACE, AND ARRIVAL TIME AT WAITING PLACE
S22
ACQUIRE ENVIRONMENTAL INFORMATION ON WAITING PLACE AT PREDETERMINED TIME INTERVALS
S23
CALCULATE ENVIRONMENTAL NONCONFORMITY VALUE AT WAITING PLACE AT PREDETERMINED TIME INTERVALS
S24
CREATE MOVING TIME COST TABLE FOR EACH PREDETERMINED PERIOD
S25
CREATE INITIAL TRANSPORTATION ROUTE AS LATEST TRANSPORTATION ROUTE
S26
CALCULATE COST VALUE OF LATEST TRANSPORTATION ROUTE
S27
COST VALUE OF LATEST TRANSPORTATION ROUTE IS SMALLER THAN COST VALUE OF BEST TRANSPORTATION ROUTE ?
NO
YES
S28
REPLACE BEST TRANSPORTATION ROUTE WITH LATEST TRANSPORTATION ROUTE
S29
LATEST TRANSPORTATION ROUTE CAN BE CREATED ?
NO
YES
S30
CREATE LATEST TRANSPORTATION ROUTE
S31
OUTPUT INFORMATION INDICATING BEST TRANSPORTATION ROUTE
END

FIG.14

| RECOMMENDED WAITING PLACE |
| --- |
| PLACE R1 |
| PLACE R2 |
| PLACE R3 |

FIG.15

| | TEMPERATURE | WEATHER | PM2.5 CONCENTRATION |
| --- | --- | --- | --- |
| PLACE R1 | 8.2 | RAINY | 2.1 |
| PLACE R2 | 11.5 | CLOUDY | 3.4 |
| PLACE R3 | 10.9 | CLOUDY | 2.1 |

FIG.16

| | ENVIRONMENTAL NONCONFORMITY VALUE |
|---|---|
| PLACE R1 | 0.8 |
| PLACE R2 | 0.4 |
| PLACE R3 | 0.9 |

FIG.17

| | PLACE R1 | PLACE R2 | PLACE R3 |
|---|---|---|---|
| PLACE P1 | 1.4 | 1.5 | 1.3 |
| PLACE P2 | 1.2 | 4.2 | 3.2 |

FIG.18

| | PLACE R2 | PLACE P2 | PLACE P3 | PLACE P4 | CURRENT POSITION OF ON-DEMAND VEHICLE D1 | CURRENT POSITION OF ON-DEMAND VEHICLE D2 |
|---|---|---|---|---|---|---|
| PLACE R2 | | 1.8 | 2.7 | 1.6 | 0.8 | 2.0 |
| PLACE P2 | 0.9 | | 3.2 | 2.1 | 2.0 | 0.5 |
| PLACE P3 | 2.4 | 3.4 | | 1.5 | 3.0 | 3.7 |
| PLACE P4 | 1.6 | 2.4 | 2.4 | | 1.8 | 2.6 |
| CURRENT POSITION OF ON-DEMAND VEHICLE D1 | 0.8 | 2.0 | 3.0 | 1.8 | | 1.2 |
| CURRENT POSITION OF ON-DEMAND VEHICLE D2 | 2.0 | 0.5 | 3.7 | 2.6 | 1.2 | |

| | TEMPERATURE | WEATHER | PM2.5 CONCENTRATION |
|---|---|---|---|
| PLACE R1 | 8.2 | RAINY | 2.1 |
| PLACE R2 | 11.5 | CLOUDY | 3.4 |
| PLACE R3 | 10.9 | CLOUDY | 2.1 |

| | ENVIRONMENTAL NONCONFORMITY VALUE |
|---|---|
| PLACE R1 | 0.8 |
| PLACE R2 | 0.4 |
| PLACE R3 | 0.9 |

| | PLACE R2 | PLACE P2 | PLACE P3 | PLACE P4 | CURRENT POSITION OF ON-DEMAND VEHICLE D1 | CURRENT POSITION OF ON-DEMAND VEHICLE D2 |
|---|---|---|---|---|---|---|
| PLACE R2 | | 1.8 | 2.7 | 1.6 | 0.8 | 2.0 |
| PLACE P2 | 0.9 | | 3.2 | 2.1 | 2.0 | 0.5 |
| PLACE P3 | 2.4 | 3.4 | | 1.5 | 3.0 | 3.7 |
| PLACE P4 | 1.6 | 2.4 | 2.4 | | 1.8 | 2.6 |
| CURRENT POSITION OF ON-DEMAND VEHICLE D1 | 0.8 | 2.0 | 3.0 | 1.8 | | 1.2 |
| CURRENT POSITION OF ON-DEMAND VEHICLE D2 | 2.0 | 0.5 | 3.7 | 2.6 | 1.2 | |

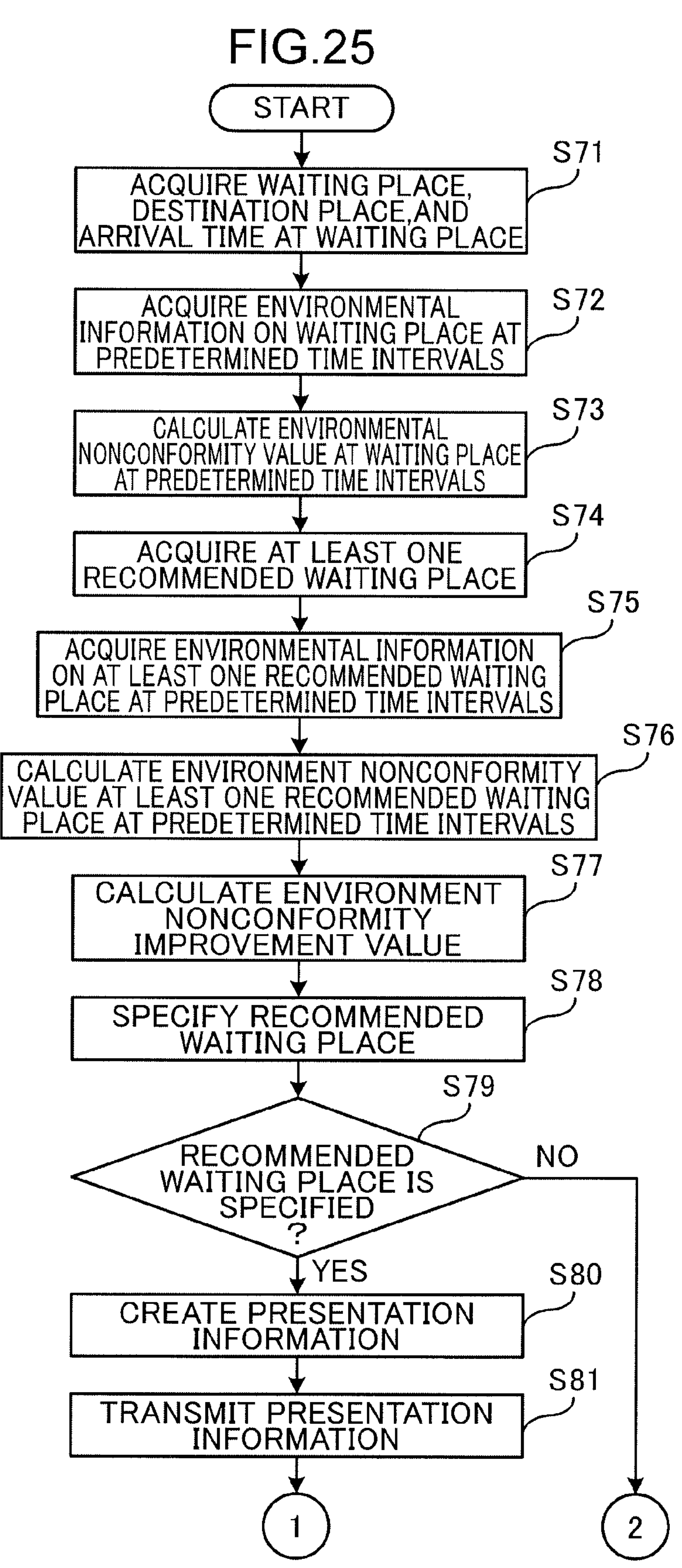
FIG.25
START
S71
ACQUIRE WAITING PLACE, DESTINATION PLACE,AND ARRIVAL TIME AT WAITING PLACE
S72
ACQUIRE ENVIRONMENTAL INFORMATION ON WAITING PLACE AT PREDETERMINED TIME INTERVALS
S73
CALCULATE ENVIRONMENTAL NONCONFORMITY VALUE AT WAITING PLACE AT PREDETERMINED TIME INTERVALS
S74
ACQUIRE AT LEAST ONE RECOMMENDED WAITING PLACE
S75
ACQUIRE ENVIRONMENTAL INFORMATION ON AT LEAST ONE RECOMMENDED WAITING PLACE AT PREDETERMINED TIME INTERVALS
S76
CALCULATE ENVIRONMENT NONCONFORMITY VALUE AT LEAST ONE RECOMMENDED WAITING PLACE AT PREDETERMINED TIME INTERVALS
S77
CALCULATE ENVIRONMENT NONCONFORMITY IMPROVEMENT VALUE
S78
SPECIFY RECOMMENDED WAITING PLACE
S79
RECOMMENDED WAITING PLACE IS SPECIFIED ?
NO
YES
S80
CREATE PRESENTATION INFORMATION
S81
TRANSMIT PRESENTATION INFORMATION
1
2

INFORMATION PROCESSING METHOD, INFORMATION PROCESSING DEVICE, AND NON-TRANSITORY COMPUTER READABLE RECORDING MEDIUM STORING INFORMATION PROCESSING PROGRAM

FIELD OF INVENTION

The present disclosure relates to a technique for creating a transportation route of a mobile body that transports passengers.

BACKGROUND ART

In recent years, on-demand transportation has attracted attention as an operation form replacing route periodic transportation for passing through stops on a regular basis, such as a route bus. The on-demand transportation allows a vehicle such as a bus or a taxi to be operated in response to a user's request. For example, transportation route of multiple vehicles in the on-demand transportation is created based on boarding places and alighting places notified from multiple users and current positions of the multiple vehicles. Then, an optimum transportation route can be automatically created by a computer.

Here, the transportation route refers a visit order to a boarding place and an alighting place of a user. For example, Non-Patent Literature 1 discloses a method for selecting the shortest transportation route from among multiple transportation routes between a boarding place and an alighting place.

Creation of a transportation route in on-demand transportation is also known as a dial-a-ride problem. For example, Non-Patent Literature 2 discloses creation of a transportation route of each vehicle in which mathematical optimization processing is performed to minimize the sum of a waiting time at a boarding place of each user and a vehicle boarding time of each user, i.e., the sum of a transportation service usage time of each user.

Unfortunately, the conventional techniques described above are required to be further improved because environment at a waiting place where a passenger waits is not reflected in the creation of a transportation route.

Non-Patent Literature 1: E. W. Dijkstra, "A Note on Two Problems in Connexion with Graphs", Numerische Mathematik, Vol. 1, 1959, p. 269-271

Non-Patent Literature 2: L. D. Bodin, T. R. Sexton, "The multi-vehicle subscriber dial-a-rideproblem", Monterey, California, Naval Postgraduate School, February 1983

SUMMARY OF THE INVENTION

The present disclosure has been made to solve the above problem, and an object of the present disclosure is to provide a technique capable of creating a transportation route in consideration of environment at a waiting place where a passenger waits.

An information processing method according to an aspect of the present disclosure includes, by a computer: acquiring a waiting place of a passenger, a destination place of the passenger, and environmental information indicating environment of the waiting place; calculating an environmental nonconformity value indicating an index of a discomfort level of environment at the waiting place for the passenger based on the environmental information on the waiting place; calculating a transportation route of a mobile body on which the passenger rides, the transportation route in which a waiting time of the passenger at the waiting place decreases as the environmental nonconformity value increases; and outputting information indicating the transportation route.

The present disclosure enables creating a transportation route in consideration of environment at a waiting place where a passenger waits.

BRIEF DESCRIPTION OF THE DRAWINGS

FIG. 1 is a diagram illustrating a general configuration of a transportation route creation system according to a first embodiment of the present disclosure.

FIG. 3 is a diagram illustrating an example of passenger information stored in a passenger information storage unit according to the first embodiment.

FIG. 4 is a diagram illustrating an example of environmental information stored in an environmental information storage unit according to the first embodiment.

FIG. 5 is a diagram illustrating an example of an environmental nonconformity value stored in an environmental nonconformity value storage unit according to the first embodiment.

FIG. 6 is a diagram illustrating an example of a moving time cost table stored in a moving time cost table storage unit according to the first embodiment.

FIG. 11 is a diagram illustrating an example of a moving time cost table for each predetermined period stored in a moving time cost table storage unit according to the second embodiment.

FIG. 12 is a flowchart for illustrating transportation route creation processing of the server according to the second embodiment of the present disclosure.

FIG. 14 is a diagram illustrating an example of recommended waiting place information stored in a recommended waiting place information storage unit according to the third embodiment.

FIG. 15 is a diagram illustrating an example of environmental information of a recommended waiting place stored in an environmental information storage unit according to the third embodiment.

FIG. 16 is a diagram illustrating an example of an environmental nonconformity value at a recommended waiting place stored in an environmental nonconformity value storage unit according to the third embodiment.

FIG. 17 is a diagram illustrating an example of an environmental nonconformity improvement value stored in an environmental nonconformity improvement value storage unit according to the third embodiment.

FIG. 18 is a diagram illustrating an example of a moving time cost table stored in a moving time cost table storage unit according to the third embodiment.

FIG. 24 is a diagram illustrating an example of a moving time cost table for each predetermined period stored in a moving time cost table storage unit according to the fourth embodiment.

FIG. 25 is a first flowchart for illustrating transportation route creation processing of the server according to the fourth embodiment of the present disclosure.

DETAILED DESCRIPTION

Underlying Knowledge of Present Disclosure

Figure 2:
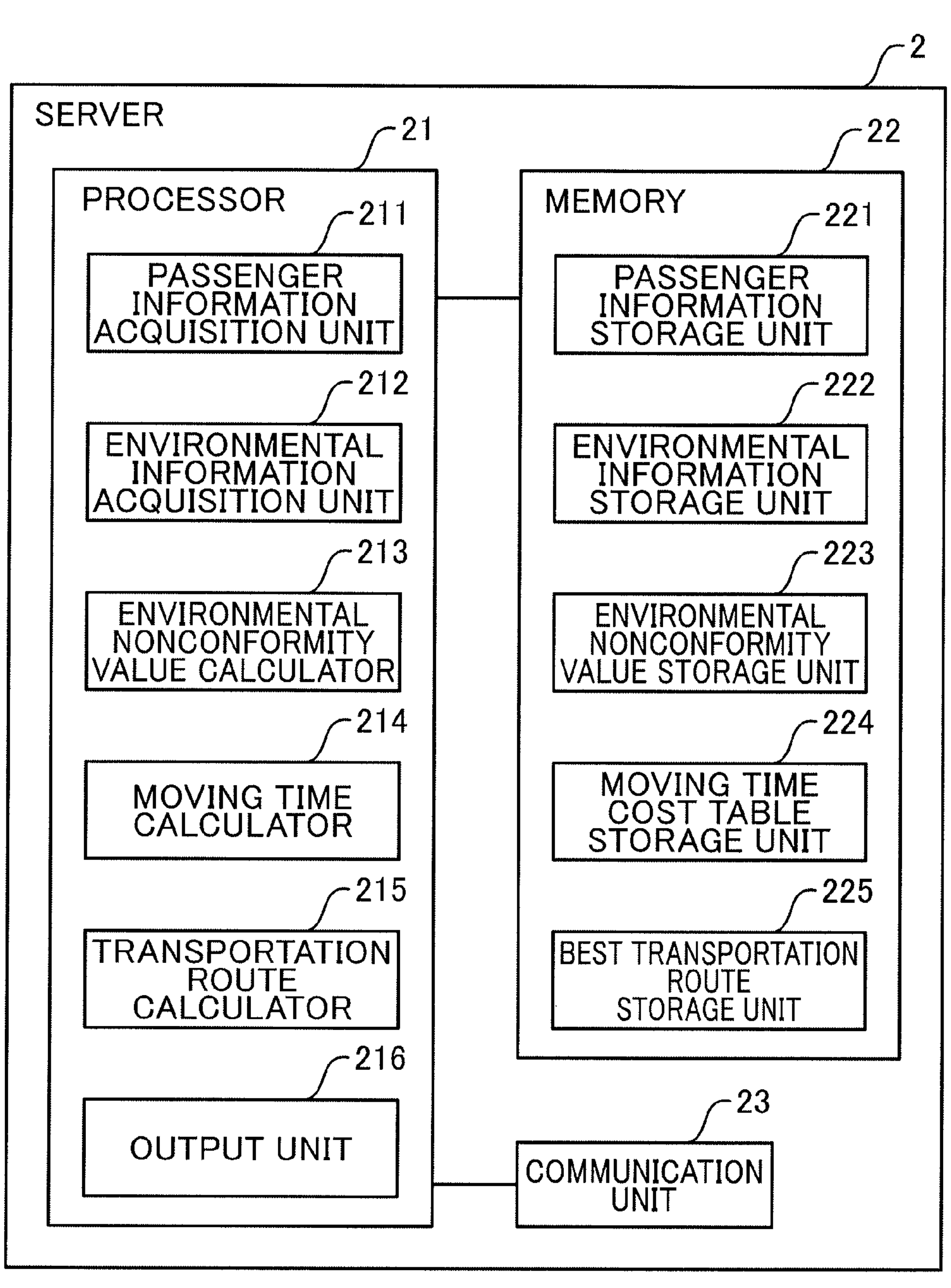
FIG. 2 is a block diagram illustrating a configuration of a server according to the first embodiment.

Although on-demand transportation allows a user to wait at a boarding place until an on-demand vehicle arrives, the waiting may not be easy depending on environment of the boarding place. Examples of the environment in which waiting is not easy include an environment with bad weather such as rain or snow, an environment with a high temperature, an environment with a low temperature, an environment with a high humidity, an environment with air contaminated with yellow sand, PM 2.5, pollen, photochemical smog, or the like, an environment with a very high congestion degree of persons, an environment with a large noise, an environment with poor security, an environment with poor footing, and an environment with poor radio wave conditions of a communication device. In such an environment, waiting may be more painful than usual.

As described above, depending on environment of the waiting place, it is considered that giving a high priority to shortening a waiting time of a user enables improvement in quality of the transportation service even if overall use time of the transportation service of the user increases.

Unfortunately, the conventional techniques described above do not reflect the environment of the user at the waiting place on creation of a transportation route. Thus, it is difficult to create a transportation route in consideration of the environment of the waiting place of the user, and transportation service of the user may be deteriorated in quality.

To solve the above problem, an information processing method according to an aspect of the present disclosure includes, by a computer: acquiring a waiting place of a passenger, a destination place of the passenger, and environmental information indicating environment of the waiting place; calculating an environmental nonconformity value indicating an index of a discomfort level of environment at the waiting place for the passenger based on the environmental information on the waiting place; calculating a transportation route of a mobile body on which the passenger rides, the transportation route in which a waiting time of the passenger at the waiting place decreases as the environmental nonconformity value increases; and outputting information indicating the transportation route.

This configuration enables creating a transportation route in consideration of environment of the waiting place where the passenger waits because the transportation route is calculated to reduce the waiting time of the passenger as the environmental nonconformity value increases with deterioration in the environment of the waiting place. As a result, discomfort of the passenger at the waiting place can be reduced to improve the transportation service in quality.

In the above information processing method, the environmental information may include at least one of temperature, humidity, weather, and concentration of fine particulate matter at the waiting place.

The temperature, the humidity, the weather, and the concentration of fine particulate matter at the waiting place are parameters that affect comfort at the waiting place where the passenger waits. Thus, an environmental nonconformity value can be calculated based on at least one of the temperature, the humidity, the weather, and the concentration of fine particulate matter at the waiting place, the environmental nonconformity value indicating an index of a discomfort level at the waiting place for the passenger.

In the above information processing method, in the calculating of the transportation route, the transportation route may be calculated to minimize a sum of the waiting time of the passenger at the waiting place, the waiting time being weighted using the environmental nonconformity value, and a moving time of the passenger to move from the waiting place at which the passenger rides on the mobile body to the destination place.

This configuration causes the waiting time of the passenger at the waiting place to be weighted using the environmental nonconformity value indicating the index of the discomfort level at the waiting place for the passenger when the transportation route of the mobile body is calculated. Thus, the transportation route can be calculated in which the waiting time of the passenger decreases as the environmental nonconformity value increases due to deterioration of environment of the waiting place.

In the above information processing method, in the acquiring of the environmental information, the environmental information may be acquired at predetermined time intervals, in the calculating of the environmental nonconformity value, the environmental nonconformity values may be calculated at the predetermined time intervals based on the environmental information at the predetermined time intervals, and in the calculating of the transportation route, an average value of environmental nonconformity values in a period from a time when the passenger arrives at the waiting place to a time when the mobile body arrives at the waiting place may be calculated based on the environmental nonconformity values at the predetermined time intervals to calculate the transportation route in which the waiting time of the passenger at the waiting place decreases as the average value of the environmental nonconformity values increases.

The environment of the waiting place may change as time elapses. Thus, the environmental information at the predetermined time intervals is acquired, and the environmental nonconformity values at the predetermined time intervals are calculated based on the environmental information at the predetermined time intervals, so that the environmental nonconformity values changing at the predetermined time intervals can be acquired. Then, the transportation route is calculated using the average value of the environmental nonconformity values in the period from the time when the passenger arrives at the waiting place to the time when the mobile body arrives at the waiting place, so that the transportation route can be calculated in consideration of the environment of the waiting place that changes at the predetermined time intervals.

In the above information processing method, in the calculating of the transportation route, the transportation route may be calculated to minimize a sum of the waiting time of the passenger at the waiting place, the waiting time being weighted using the average value of the environmental nonconformity values, and the moving time of the passenger to move from the waiting place at which the passenger rides on the mobile body to the destination place.

This configuration enables the transportation route to be calculated in consideration of the environment of the waiting place that changes at the predetermined time intervals by weighting the waiting time using the average value of the environmental nonconformity values in the period from the time when the passenger arrives at the waiting place to the time when the mobile body arrives at the waiting place.

The above information processing method may further include: acquiring information on at least one recommended waiting place within a predetermined distance from the waiting place; acquiring environmental information on the at least one recommended waiting place; calculating the environmental nonconformity value at the at least one recommended waiting place based on the environmental information on the at least one recommended waiting place; calculating an environmental nonconformity improvement value of at least one type improved by moving from the waiting place to the at least one recommended waiting place based on the environmental nonconformity value at the waiting place, the environmental nonconformity value at the at least one recommended waiting place, and a moving time from the waiting place to the at least one recommended waiting place; specifying a recommended waiting place corresponding to an environmental nonconformity improvement value that is equal to or more than a threshold and is maximum among environmental nonconformity improvement values of the at least one type; transmitting presentation information for prompting the passenger to move to the specified recommended waiting place, wherein in the calculating of the transportation route, the transportation route may be calculated in which the waiting time of the passenger at the recommended waiting place decreases as the environmental nonconformity value at the specified recommended waiting place increases, when response information indicating acceptance of the movement to the recommended waiting place is received in response to the presentation information.

This configuration specifies the recommended waiting place in environment improved from the environment of the current waiting place, and presents the specified recommended waiting place to the passenger. Then, when the response information indicating acceptance of the movement to the recommended waiting place is received, the transportation route is calculated in which the waiting time of the passenger at the recommended waiting place decreases as the environmental nonconformity value at the specified recommended waiting place increases. Thus, the passenger can be prompted to move to the recommended waiting place in environment more comfortable than the environment of the current waiting place, and the passenger can wait in a more comfortable environment by moving to the recommended waiting place.

In the above information processing method, in the calculating of the transportation route, the transportation route may be calculated to minimize a sum of the waiting time of the passenger at the waiting place, the waiting time being weighted using the environmental nonconformity value at the waiting place, and the moving time of the passenger to move from the waiting place at which the passenger rides on the mobile body to the destination place, when the response information indicating non-acceptance of the movement to the recommended waiting place is received in response to the presentation information.

This configuration enables calculating the transportation route in consideration of the environment of the current waiting place when the passenger does not accept the movement to the recommended waiting place.

In the above information processing method, in the calculating of the transportation route, the transportation route may be calculated to minimize a sum of the waiting time of the passenger at the recommended waiting place specified, the waiting time being weighted using the environmental nonconformity value at the recommended waiting place, and the moving time of the passenger to move from the recommended waiting place at which the passenger rides on the mobile body to the destination place, when the response information indicating acceptance of the movement to the recommended waiting place is received in response to the presentation information.

This configuration allows the transportation route to be calculated to minimize a sum of the waiting time of the passenger at the recommended waiting place, the waiting time being weighted using the environmental nonconformity value at the recommended waiting place specified, and the moving time of the passenger to move from the recommended waiting place at which the passenger rides on the mobile body to the destination place, when the response information indicating acceptance of the movement to the recommended waiting place is received. Thus, the passenger can be prompted to move to the recommended waiting place in environment more comfortable than the environment of the current waiting place, and the passenger can wait in a more comfortable environment by moving to the recommended waiting place.

In the above information processing method, in the acquiring of the environmental information on the waiting place, the environmental information on the waiting place at predetermined time intervals may be acquired, in the acquiring of the environmental information on the at least one recommended waiting place, the environmental information on the at least one recommended waiting place at the predetermined time intervals may be acquired, in the calculating of the environmental nonconformity value at the waiting place, the environmental nonconformity value at the waiting place at the predetermined time intervals may be calculated based on the environmental information on the waiting place at the predetermined time intervals, in the calculating of the environmental nonconformity value at the at least one recommended waiting place, an environmental nonconformity value of at least one type at the at least one recommended waiting place at the predetermined time intervals may be calculated based on the environmental information on the at least one recommended waiting place at the predetermined time intervals, in the calculating of the environmental nonconformity improvement value of the at least one type, an environmental nonconformity improvement value of at least one type to be improved by moving from the waiting place to the at least one recommended waiting place may be calculated based on the environmental nonconformity value at a current time among environmental nonconformity values at the waiting place at the predetermined time intervals, the environmental nonconformity value of the at least one type at a scheduled arrival time of the passenger among environmental nonconformity values of the at least one type at the at least one recommended waiting place at the predetermined time intervals, and a moving time from the waiting place to the at least one recommended waiting place, and in the calculating of the transportation route, when response information indicating acceptance of movement to the recommended waiting place is received in response to the presentation information, an average value of the environmental nonconformity values in a period from time when the passenger arrives at the recommended waiting place to time when the mobile body arrives at the recommended waiting place may be calculated based on the environmental nonconformity values at the recommended waiting place specified at the predetermined time intervals to calculate the transportation route in which the waiting time of the passenger at the recommended waiting place decreases as the average value of the environmental nonconformity values at the recommended waiting place specified increases.

The environment of the waiting place and the recommended waiting place may change as time elapses. Thus, the environmental information on the current waiting place and the at least one recommended waiting place at the predetermined time intervals is acquired, and the environmental nonconformity values at the current waiting place and the at least one recommended waiting place at the predetermined time intervals are each calculated based on the environmental information at the predetermined time intervals. Then, the recommended waiting place in environment improved from the environment of the current waiting place is specified, and the specified recommended waiting place is presented to the passenger. Subsequently, when the response information indicating acceptance of the movement to the recommended waiting place is received, the transportation route is calculated using the average value of the environmental nonconformity values in the period from the time when the passenger arrives at the recommended waiting place to the time when the mobile body arrives at the recommended waiting place, and thus the transportation route can be calculated in consideration of the environment of the recommended waiting place that changes at the predetermined time intervals.

In the above information processing method, in the calculating of the transportation route, the transportation route may be calculated to minimize a sum of the waiting time of the passenger at the recommended waiting place specified, the waiting time being weighted using the average value of the environmental nonconformity values at the recommended waiting place, and the moving time of the passenger to move from the recommended waiting place at which the passenger rides on the mobile body to the destination place, when the response information indicating acceptance of the movement to the recommended waiting place is received in response to the presentation information.

This configuration enables the transportation route to be calculated in consideration of the environment of the recommended waiting place that changes at the predetermined time intervals by weighting the waiting time using the average value of the environmental nonconformity values in the period from the time when the passenger arrives at the recommended waiting place to the time when the mobile body arrives at the recommended waiting place, when the response information indicating acceptance of the movement to the recommended waiting place is received.

The present disclosure can be implemented not only as the information processing method that performs characteristic processing as described above, but also as an information processing device or the like having a characteristic configuration corresponding to a characteristic method performed according to the information processing method. The present disclosure can also be implemented as a computer program that causes a computer to execute characteristic processing included the information processing method described above. Thus, even other aspects below can achieve an effect as in the above information processing method.

An information processing device according to another aspect of the present disclosure includes: an acquisition unit that acquires a waiting place of a passenger, a destination place of the passenger, and environmental information indicating environment of the waiting place; an environmental nonconformity value calculator that calculates an environmental nonconformity value indicating an index of a discomfort level of environment at the waiting place for the passenger based on the environmental information on the waiting place; a transportation route calculator that calculates a transportation route of a mobile body on which the passenger rides, the transportation route in which a waiting time of the passenger at the waiting place decreases as the environmental nonconformity value increases; and an output unit that outputs information indicating the transportation route.

A non-transitory computer readable recording medium according to yet another aspect of the present disclosure stores an information processing program, the information processing program causes a computer to execute processing of: acquiring a waiting place of a passenger, a destination place of the passenger, and environmental information indicating environment of the waiting place; calculating an environmental nonconformity value indicating an index of a discomfort level of environment at the waiting place for the passenger based on the environmental information on the waiting place; calculating a transportation route of a mobile body on which the passenger rides, the transportation route in which a waiting time of the passenger at the waiting place decreases as the environmental nonconformity value increases; and outputting information indicating the transportation route.

Each of embodiments described below illustrates a specific example of the present disclosure. Numerical values, shapes, components, steps, order of steps, and the like shown in the embodiments below are merely examples, and are not intended to limit the present disclosure. The components in the embodiments below includes a component that is not described in independent claims indicating the highest concept, and then the component is described as an optional component. In all the embodiments, respective contents can be combined.

First Embodiment

Figure 1:
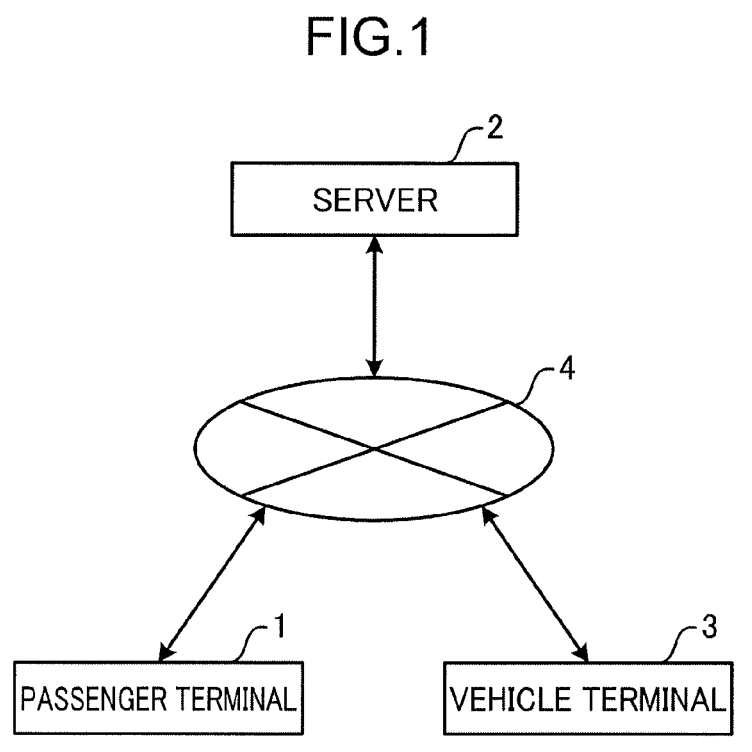

FIG. 1 is a diagram illustrating a general configuration of a transportation route creation system according to a first embodiment of the present disclosure.

The transportation route creation system illustrated in FIG. 1 includes a passenger terminal 1, a server 2, and a vehicle terminal 3.

The passenger terminal 1 is a smartphone, a tablet computer, or a personal computer, for example, and is carried by a passenger who rides on an on-demand vehicle. The on-demand vehicle is an on-demand bus, a shared taxi, or a private car driven by an ordinary person and dispatched by a dispatch platform, for example. The passenger rides on the on-demand vehicle at a waiting place and alights from the on-demand vehicle at a destination place. The passenger terminal 1 is communicably connected to the server 2 via a network 4. The network 4 is the Internet, for example.

The passenger terminal 1 receives an input of a dispatch request for an on-demand vehicle from a passenger, and transmits dispatch request information for requesting dispatch of an on-demand vehicle to the server 2. The passenger terminal 1 receives a waiting place, a destination place, and an arrival time at the waiting place, which are input by the passenger. The waiting place is for a passenger to ride on an on-demand vehicle. The waiting place may be a predetermined place such as a stop. The waiting place may be also a place arbitrarily designated by the passenger.

Examples of a dispatch pattern of a passenger include a dispatch pattern in which dispatch is reserved before the passenger arrives at a waiting place, and a dispatch pattern in which the dispatch is requested after the passenger arrives at the waiting place.

The passenger terminal 1 may receive one waiting place and one destination place selected by a passenger from among multiple predetermined stop places. The passenger terminal 1 may also display a map and receive an arbitrary waiting place and an arbitrary destination place on the displayed map, which are input by the passenger. The passenger terminal 1 may also receive addresses of the arbitrary waiting place and the arbitrary destination place, which are input by the passenger. When the passenger reserves dispatch in advance, the waiting place is a waiting place where the passenger is scheduled to get on. When the passenger requests dispatch after arriving at a waiting place, the waiting place is a current position of the passenger.

When the passenger reserves dispatch in advance, an arrival time is a time at which the passenger is scheduled to get on. When the passenger requests dispatch after arriving at the waiting place, the arrival time is the current time.

The passenger terminal 1 transmits dispatch request information including information for identifying a passenger, a waiting place, a destination place, and an arrival time at the waiting place, to the server 2. The information for identifying a passenger may be a user ID for identifying the passenger or a terminal ID for identifying the passenger terminal 1.

When the passenger terminal 1 includes a global positioning system (GPS) receiver and is used to request dispatch after the passenger arrives at a waiting place, the passenger terminal 1 transmits dispatch request information to the server 2, the dispatch request information including a current position acquired by the UPS receiver and set as the waiting place, and a current time set as the arrival time.

The server 2 creates a transportation route of at least one on-demand vehicle for transporting at least one passenger from the waiting place to the destination place. The server 2 is communicably connected to the passenger terminal 1 and the vehicle terminal 3 via the network 4. The server 2 transmits information indicating the created transportation route to the vehicle terminal 3.

The vehicle terminal 3 is provided in the on-demand vehicle, and receives information indicating the transportation route transmitted by the server 2. The vehicle terminal 3 displays the received transportation route. The vehicle terminal 3 presents the transportation route to the driver of the on-demand vehicle accordingly. The driver moves the on-demand vehicle according to the transportation route displayed on the vehicle terminal 3.

The vehicle terminal 3 may be a terminal such as a smartphone or a tablet computer carried by the driver of the on-demand vehicle. When the on-demand vehicle is an automatic driving vehicle, the server 2 may transmit information indicating the created transportation route to the on-demand vehicle. In this case, the on-demand vehicle may move according to the received transportation route.

The transportation route creation system may include multiple passenger terminals 1 carried by respective multiple passengers and multiple vehicle terminals 3 provided in respective multiple on-demand vehicles.

FIG. 2 is a block diagram illustrating a configuration of the server 2 according to the first embodiment.

The server 2 includes a processor 21, a memory 22, and a communication unit 23.

The processor 21 is a central processing unit (CPU), for example. The processor 21 implements a passenger information acquisition unit 211, an environmental information acquisition unit 212, an environmental nonconformity value calculator 213, a moving time calculator 214, a transportation route calculator 215, and an output unit 216.

The memory 22 is a storage device capable of storing various types of information, such as a random access memory (RAM), a hard disk drive (HDD), a solid state drive (SSD), or a flash memory. The memory 22 implements a passenger information storage unit 221, an environmental information storage unit 222, an environmental nonconformity value storage unit 223, a moving time cost table storage unit 224, and a best transportation route storage unit 225.

The passenger information acquisition unit 211 acquires the waiting place of the passenger, the destination place of the passenger, and the arrival time at the waiting place from the passenger terminal 1 via the communication unit 23. The communication unit 23 receives the dispatch request information transmitted by the passenger terminal 1. The dispatch request information includes the information for identifying a passenger, the waiting place of the passenger, the destination place of the passenger, and the arrival time at the waiting place. The passenger information acquisition unit 211 stores the waiting place, the destination place, and the arrival time at the waiting place, which are included in the dispatch request information received by the communication unit 23 and associated with the passenger, in the passenger information storage unit 221.

The passenger information storage unit 221 stores the waiting place, the destination place, and the arrival time at the waiting place in association with the passenger.

FIG. 3 is a diagram illustrating an example of passenger information stored in the passenger information storage unit 221 according to the first embodiment.

As illustrated in FIG. 3, the passenger information storage unit 221 stores the waiting place, the destination place, and the arrival time at the waiting place for each passenger. For example, the waiting place of a passenger U1 is a place P1, the destination place of the passenger U1 is a place P3, and the arrival time at the waiting place of the passenger U1 is 10:00. For example, the waiting place of a passenger U2 is a place P2, the destination place of the passenger U2 is a place P4, and the arrival time at the waiting place of the passenger U2 is 10:20.

The passenger information acquisition unit 211 acquires the waiting place, the destination place, and the arrival time at the waiting place of the passenger from the passenger information storage unit 221 when creating the transportation route.

The environmental information acquisition unit 212 acquires environmental information indicating environment of the waiting place from an external server via the communication unit 23. The environmental information acquisition unit 212 transmits position information on the waiting place acquired by the passenger information acquisition unit 211 to the external server via the communication unit 23. Upon receiving the position information on the waiting place transmitted by the server 2, the external server transmits the environmental information indicating the environment of the waiting place to the server 2. The communication unit 23 receives the environmental information transmitted by the external server. For example, the environmental information includes temperature, weather, and concentration of fine particulate matter (PM 2.5) at the waiting place. The environmental information may include at least one of the temperature, the humidity, the weather, and the concentration of fine particulate matter at the waiting place. The environmental information acquisition unit 212 stores the environmental information, which is received by the communication unit 23 and associated with the waiting place, in the environmental information storage unit 222.

The environmental information storage unit 222 stores the environmental information in association with the waiting place.

FIG. 4 is a diagram illustrating an example of environmental information stored in the environmental information storage unit 222 according to the first embodiment.

As illustrated in FIG. 4, the environmental information storage unit 222 stores temperature, weather, and PM 2.5 concentration in association with the waiting place. For example, the place P1 of the waiting place has a temperature of 1.2° C., rainy weather, and a PM 2.5 concentration of 2.4 $\mu g/m^3$. For example, the place P2 of the waiting place has a temperature of 1.2° C., cloudy weather, and a PM 2.5 concentration of 3.2 $\mu g/m^3$.

Although in the first embodiment, the environmental information includes the temperature, the weather, and the concentration of fine particulate matter at the waiting place, the present disclosure is not particularly limited thereto. The environmental information may include other information about natural environment, such as humidity at the waiting place, concentration of pollen at the waiting place, and concentration of photochemical smog at the waiting place. The environmental information may include other information related to environment that artificially changes, such as a congestion degree of persons at the waiting place, a noise level at the waiting place, a security situation at the waiting place, poor footing at the waiting place, and a radio wave condition of a communication device at the waiting place. The environmental information may further include other information on a facility, such as presence of a roof at the waiting place, and presence of a chair at the waiting place.

The environmental information acquisition unit 212 may acquire the environmental information from a sensor provided in the waiting place instead of acquiring the environmental information from the external server. The sensor provided at the waiting place may measure temperature, humidity, weather, concentration of fine particulate matter, and concentration of photochemical smog at the waiting place. The congestion degree of persons at the waiting place may be calculated from the number of persons detected from an image obtained by photographing the periphery of the waiting place. The noise level at the waiting place may be measured by a noise meter provided at the waiting place. The security situation at the waiting place may be acquired from an external server that provides the security situation. The poor footing at the waiting place may be determined whether the footing is poor based on the amount of moisture in the ground at the waiting place detected by a sensor provided at the waiting place. The radio wave condition of the communication device at the waiting place may be measured by a sensor provided at the waiting place.

The environmental nonconformity value calculator 213 calculates an environmental nonconformity value indicating an index of a discomfort level of environment for the passenger at the waiting place based on the environmental information on the waiting place. The environmental nonconformity value calculator 213 calculates an environmental nonconformity value α at the waiting place using Equation (1) below.

$$\alpha=a*|T-T_0|+b*W+c*PM \quad (1)$$

In Equation (1), T represents temperature at the waiting place, $T_0$ represents reference temperature (e.g., 25° C.), and W represents digitized weather at the waiting place. When the weather is sunny or cloudy, 0 is assigned to W, when the weather is rainy, 1 is assigned to W, and when the weather is snowy, 2 is assigned to W. PM represents concentration of PM 2.5 at the waiting place. Additionally, a, b, and c are weighting coefficients for respective parameters. Here, a, b, and c are each 0 or more. The environmental nonconformity value α increases as the environment increases in discomfort level.

The environmental nonconformity value calculator 213 may use environmental information other than the temperature, the weather, and the concentration of PM 2.5, as parameters of the environmental nonconformity value α. For example, the humidity at the waiting place, the concentration of photochemical smog at the waiting place, the congestion degree of persons at the waiting place, or the noise level at the waiting place may be used as the parameter of the environmental nonconformity value α. For the parameter of the security situation at the waiting place, 0 may be assigned to good security, and 1 may be assigned to poor security. For the parameter of the poor footing at the waiting place, 0 may be assigned to the amount of moisture in the ground at the waiting place, the amount being equal to or less than a threshold, and 1 may be assigned to the amount of moisture in the ground at the waiting place, the amount being larger than the threshold. For the parameter of the radio wave condition of a communication device at the waiting place, 0 may be assigned to a reception level of radio waves at the waiting place, the reception level being larger than a threshold, and 1 may be assigned to a reception level of the radio waves at the waiting place, the reception level being equal to or less than the threshold. For the parameter of whether the waiting place has a roof, 0 may be assigned to the waiting place with a roof, and 1 may be assigned to the waiting place without a roof. For the parameter of whether the waiting place has a chair, 0 may be assigned to the waiting place with a chair, and 1 may be assigned to the waiting place without a chair.

The environmental nonconformity value calculator 213 stores the calculated environmental nonconformity value in the environmental nonconformity value storage unit 223 while associating the value with the waiting place.

The environmental nonconformity value storage unit 223 stores the environmental nonconformity value calculated by the environmental nonconformity value calculator 213 while associating the value with the waiting place.

FIG. 5 is a diagram illustrating an example of an environmental nonconformity value stored in the environmental nonconformity value storage unit 223 according to the first embodiment.

As illustrated in FIG. 5, the environmental nonconformity value storage unit 223 stores the environmental nonconformity value in association with the waiting place. For example, the place P1 of the waiting place has an environmental nonconformity value of 1.4, and the place P2 of the waiting place has an environmental nonconformity value of 1.2.

The moving time calculator 214 calculates moving times of all combinations of the waiting place, the destination place, and the current position of the on-demand vehicle, in which one of the waiting place, the destination place, and the current position of the on-demand vehicle is set as a start point and the other is set as an end point. Specifically, the moving time calculator 214 calculates a moving time from the waiting place to the destination place, a moving time from the waiting place to the current position of the on-demand vehicle, a moving time from the destination place to the waiting place, a moving time from the destination place to the current position of the on-demand vehicle, a moving time from the current position of the on-demand vehicle to the waiting place, and a moving time from the current position of the on-demand vehicle to the destination place. When there are waiting places and destination places of multiple passengers, the moving time calculator 214 also calculates a moving time between the multiple waiting places and a moving time between the multiple destination places.

The moving time calculator 214 uses a method for calculating a moving time between places, the method being a conventional technique, and thus description thereof will be omitted.

The vehicle terminal 3 includes a GPS receiver, and periodically transmits the current position of the vehicle terminal 3 to the server 2 as the current position of the on-demand vehicle. The server 2 receives the current position of the on-demand vehicle transmitted by the vehicle terminal 3, and stores the current position of the on-demand vehicle in the memory 22. Thus, the server 2 grasps the current position of the on-demand vehicle. The on-demand vehicle may periodically transmit its current position to the server 2. When a departure point of the on-demand vehicle is predetermined, the server 2 may previously store the departure point of the on-demand vehicle as the current position of the on-demand vehicle.

The moving time calculator 214 creates a moving time cost table in which the calculated moving times of all the combinations of the waiting place, the destination place, and the current position of the on-demand vehicle are represented in a table format, and stores the created moving time cost table in the moving time cost table storage unit 224.

The moving time cost table storage unit 224 stores the moving time cost table created by the moving time calculator 214, the table representing the moving times of all the combinations of the waiting place, the destination place, and the current position of the on-demand vehicle in a table format.

FIG. 6 is a diagram illustrating an example of a moving time cost table stored in the moving time cost table storage unit 224 according to the first embodiment.

FIG. 6 shows that the place P1 is a waiting place of the passenger U1, the place P2 is a waiting place of the passenger U2, the place P3 is a destination place of the passenger U1, and the place P4 is a destination place of the passenger U2. In the moving time cost table, items in a vertical axis represent places to be start points, and items in a horizontal axis represent places to be end points. Each element value in the moving time cost table represents a moving time between places.

As illustrated in FIG. 6, when there are multiple waiting places, multiple destination places, and current positions of multiple on-demand vehicles, the moving time calculator 214 calculates moving times of all combinations of the multiple waiting places, the multiple destination places, and the current positions of the multiple on-demand vehicles.

For example, the moving time from the place P1 to the place P2 is 1.5 minutes, the moving time from the place P1 to the place P3 is 2.4 minutes, the moving time from the place P1 to the place P4 is 1.3 minutes, the moving time from the place P1 to the current position of an on-demand vehicle D1 is 0.5 minutes, and the moving time from the place P1 to the current position of an on-demand vehicle D2 is 1.7 minutes.

The moving time from the place P1 to the place P2 and the moving time from the place P2 to the place P1 are not necessarily equal to each other. This is because a moving route from the place P1 to the place P2 and a moving route from the place P2 to the place P1 have different road situations. For example, when the moving route from the place P1 to the place P2 is more crowded than the moving route from the place P2 to the place P1, the moving time from the place P1 to the place P2 is longer than the moving time from the place P2 to the place P1. Additionally, due to one-way traffic, the same road may not be used for the moving route from the place P1 to the place P2 and the moving route from the place P2 to the place P1.

The transportation route calculator 215 calculates a transportation route of the on-demand vehicle on which the passenger rides so that the waiting time of the passenger at the waiting place decreases as the environmental nonconformity value increases.

More specifically, the transportation route calculator 215 calculates the transportation route of the on-demand vehicle to minimize a sum of the waiting time of the passenger at the waiting place, the waiting time being weighted using the environmental nonconformity value, and a moving time of the passenger to move from the waiting place at which the passenger rides on the mobile body to the destination place. Specifically, the transportation route calculator 215 calculates a transportation route to minimize a solution of an objective function f expressed by Equation (2) below.

[Formula 1]

$$f := \sum_{c \in C} \alpha_C * \text{wait}_C + \text{move}_C \tag{2}$$

In Equation (2), C represents a set of passengers c, $\alpha_c$ represents an environmental nonconformity value at a waiting place of the passengers c, $\text{wait}_c$ represents a waiting time at the waiting place of the passengers c, and $\text{move}_c$, represents a vehicle boarding time (moving time) of the passengers c.

First, the transportation route calculator 215 creates a transportation route using at least one of a cross exchange neighborhood search, a two-opt* neighborhood search, and an in-route insertion neighborhood search. The cross exchange neighborhood search, the two-opt* neighborhood search, and the in-route insertion neighborhood search are disclosed in the document "Application of local search method to vehicle routing problem with time window constraints" (Tomoyasu Masuda et al., Kokyuroku document at the Research Institute for Mathematical Sciences, 1999, Vol. 1114, 194-205). Next, the transportation route calculator 215 calculates a cost value of the created transportation route. The cost value is the solution of the objective function f expressed by Equation (2). At this time, the transportation route calculator 215 calculates $wait_c$ and $move_c$ based on the moving time cost table stored in the moving time cost table storage unit 224. The transportation route calculator 215 also reads out the environmental nonconformity value $\alpha_c$ at the waiting place of the passengers c from the environmental nonconformity value storage unit 223. The transportation route calculator 215 compares the cost value of the transportation route created this time with a cost value of the best transportation route stored in the best transportation route storage unit 225. When the cost value of the transportation route created this time is smaller than the cost value of the best transportation route stored in the best transportation route storage unit 225, the transportation route calculator 215 replaces the best transportation route stored in the best transportation route storage unit 225 with the transportation route created this time. Then, the transportation route calculator 215 repeats the above processing until a new transportation route cannot be created.

The best transportation route storage unit 225 stores the best transportation route and the cost value of the best transportation route.

The output unit 216 outputs information indicating the transportation route calculated by the transportation route calculator 215. When the transportation route calculator 215 determines that a new transportation route cannot be created, the output unit 216 outputs the best transportation route stored in the best transportation route storage unit 225. The output unit 216 transmits information indicating the transportation route to the vehicle terminal 3 via the communication unit 23.

Subsequently, transportation route creation processing of the server 2 according to the first embodiment of the present disclosure will be described.

Figure 7:
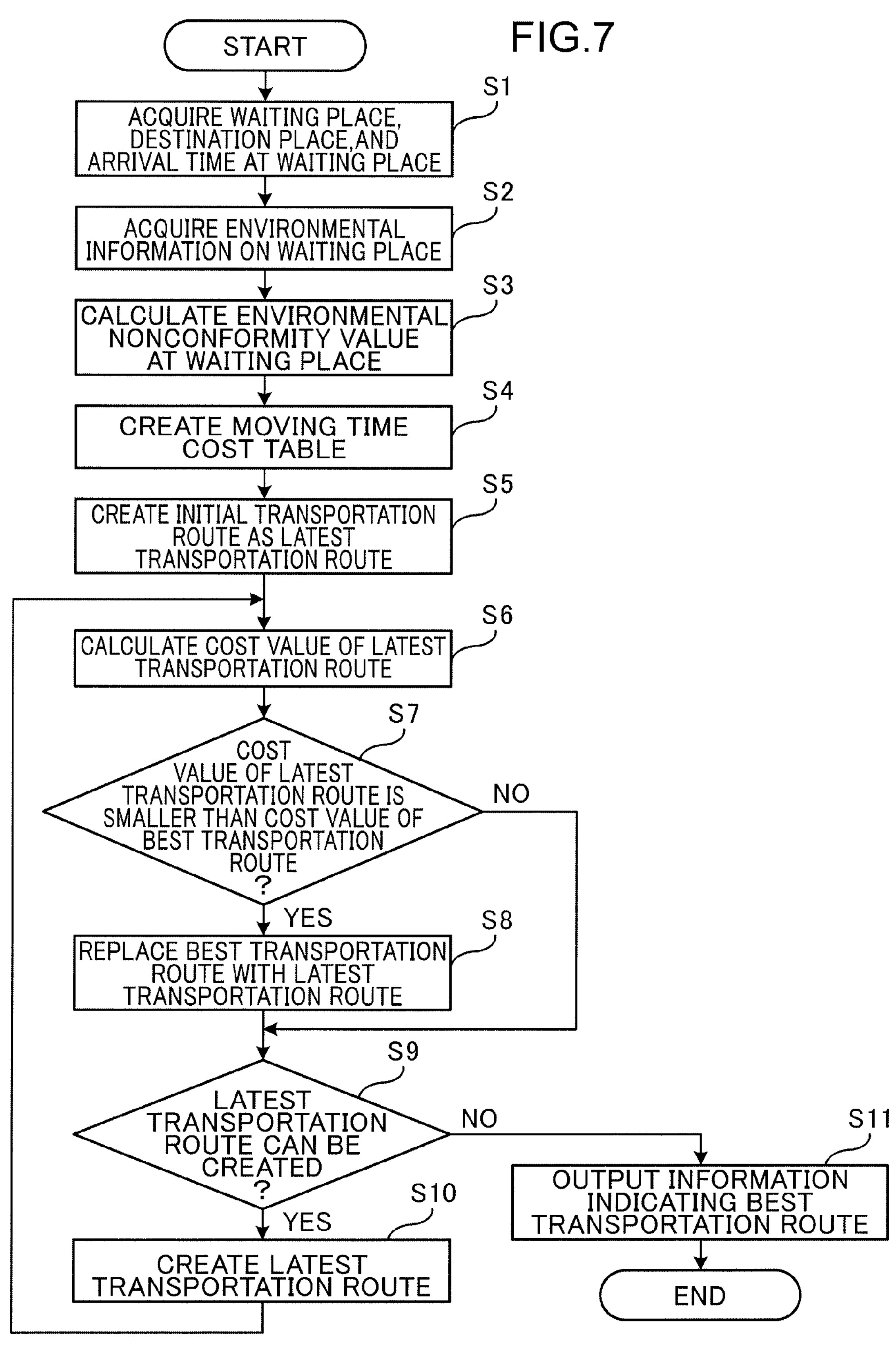
FIG. 7 is a flowchart for illustrating transportation route creation processing of the server according to the first embodiment of the present disclosure.

FIG. 7 is a flowchart for illustrating the transportation route creation processing of the server 2 according to the first embodiment of the present disclosure.

The transportation route creation processing is executed at predetermined time intervals. The predetermined time is one hour, for example. When a passenger reserves dispatch in advance, a transportation route is created for the passenger having reserved the dispatch during a period from a start time of the transportation route creation processing to a time after the predetermined time elapses. When a passenger requests dispatch after arriving at a waiting place, a transportation route is created for the passenger having requested the dispatch during a period from a start time of the transportation route creation processing to a time before the predetermined time elapses.

In step S1, the passenger information acquisition unit 211 first acquires a waiting place, a destination place, and an arrival time at the waiting place of a passenger from the passenger information storage unit 221. When the passenger information storage unit 221 stores waiting places, destination places, and arrival times at the respective waiting places of multiple passengers, the passenger information acquisition unit 211 acquires the waiting places, the destination places, and the arrival times at the respective waiting places of the multiple passengers from the passenger information storage unit 221. The passenger information acquisition unit 211 does not acquire a waiting place, a destination place, and an arrival time at the waiting place of a passenger whose transportation route has already been created, and acquires a waiting place, a destination place, and an arrival time at the waiting place of a passenger whose transportation route has not been created.

In subsequent step S2, the environmental information acquisition unit 212 acquires environmental information indicating environment of the waiting place acquired by the passenger information acquisition unit 211 from the external server.

In subsequent step S3, the environmental nonconformity value calculator 213 calculates an environmental nonconformity value indicating an index of a discomfort level of environment at the waiting place for the passenger based on the environmental information acquired by the environmental information acquisition unit 212.

In subsequent step S4, the moving time calculator 214 calculates moving times of all combinations of the waiting place, the destination place, and the current position of the on-demand vehicle acquired by the passenger information acquisition unit 211, and creates a moving time cost table in which the calculated moving times of all the combinations are represented in a table format.

In subsequent step S5, the transportation route calculator 215 creates an initial transportation route as the latest transportation route. The transportation route calculator 215 randomly creates the initial transportation route before optimization, satisfying predetermined restriction conditions. The predetermined restriction conditions include a restriction in which a waiting place and a destination place of an identical passenger have to be allocated to an identical on-demand vehicle, and a restriction in which the identical on-demand vehicle has to arrive at the waiting place before arriving at the destination place. The transportation route calculator 215 sets a cost value of the best transportation route to infinity without setting the best transportation route of the best transportation route storage unit 225.

In subsequent step S6, the transportation route calculator 215 calculates a cost value of the created latest transportation route. The transportation route calculator 215 calculates the cost value of the latest transportation route using Equation (2). Specifically, the transportation route calculator 215 calculates not only a waiting time at the waiting place of the latest transportation route using the moving time cost table, but also a moving time from the waiting place to the destination place of the latest transportation route. Then, the transportation route calculator 215 calculates the cost value by totaling the waiting time weighted using the environmental nonconformity value and the moving time for moving from the waiting place to the destination place. The transportation route calculator 215 first calculates a cost value of the created initial transportation route.

In subsequent step S7, the transportation route calculator 215 determines whether the cost value of the created latest transportation route is smaller than the cost value of the best transportation route stored in the best transportation route storage unit 225. The cost value of the best transportation route is first set to infinity, so that the transportation route calculator 215 determines that the cost value of the latest transportation route is smaller than the cost value of the best transportation route.

Here, when it is determined that the cost value of the latest transportation route is not smaller than the cost value of the best transportation route (NO in step S7), the processing proceeds to step S9.

In contrast, when it is determined that the cost value of the latest transportation route is smaller than the cost value of the best transportation route (YES in step S7), the transportation route calculator 215 replaces the best transportation route stored in the best transportation route storage unit 225 with the latest transportation route in step S8.

In subsequent step S9, the transportation route calculator 215 determines whether the latest transportation route can be created.

Here, when it is determined that the latest transportation route can be created (YES in step S9), the transportation route calculator 215 creates the latest transportation route in step S10.

In contrast, when it is determined that the latest transportation route cannot be created (NO in step S9), in step S11, the output unit 216 output information indicating the best transportation route stored in the best transportation route storage unit 225.

As described above, when the transportation route of the on-demand vehicle is calculated, the waiting time of the passenger at the waiting place is weighted using the environmental nonconformity value indicating the index of the discomfort level at the waiting place for the passenger. Thus, a transportation route in consideration of environment of the waiting place where the passenger waits can be created because the transportation route is calculated to reduce the waiting time of the passenger as the environmental nonconformity value increases with deterioration in the environment of the waiting place. As a result, discomfort of the passenger at the waiting place can be reduced to improve the transportation service in quality.

Although in the first embodiment, the current position of the on-demand vehicle moving according to a transportation route having been already created is not used in creation of a new transportation route, the present disclosure is not particularly limited thereto. The transportation route calculator 215 may use the current position of the on-demand vehicle moving according to the transportation route having been already created in the creation of a new transportation route. The transportation route calculator 215 can correct the transportation route of the on-demand vehicle during movement based on a new waiting place, destination place, and an arrival time at the waiting place accordingly, when new dispatch request information is received during the movement of the on-demand vehicle.

Second Embodiment

In the first embodiment, a temporal change in environment of a waiting place is not considered. In contrast, a second embodiment causes environmental nonconformity values at predetermined time intervals to be calculated in consideration of change in environment of a waiting place at the predetermined time intervals.

For example, temperature, weather, and concentration of PM 2.5 change as time elapses, so that an environmental nonconformity value also changes as time elapses. The second embodiment causes the environmental nonconformity values at predetermined time intervals to be calculated in accordance with change in environment of the waiting place at the predetermined time intervals. This calculation enables creating a transportation route for picking up a passenger within 20 minutes when rain in 20 minutes at the waiting place is predicted regardless of being currently sunny, for example.

Figure 8:
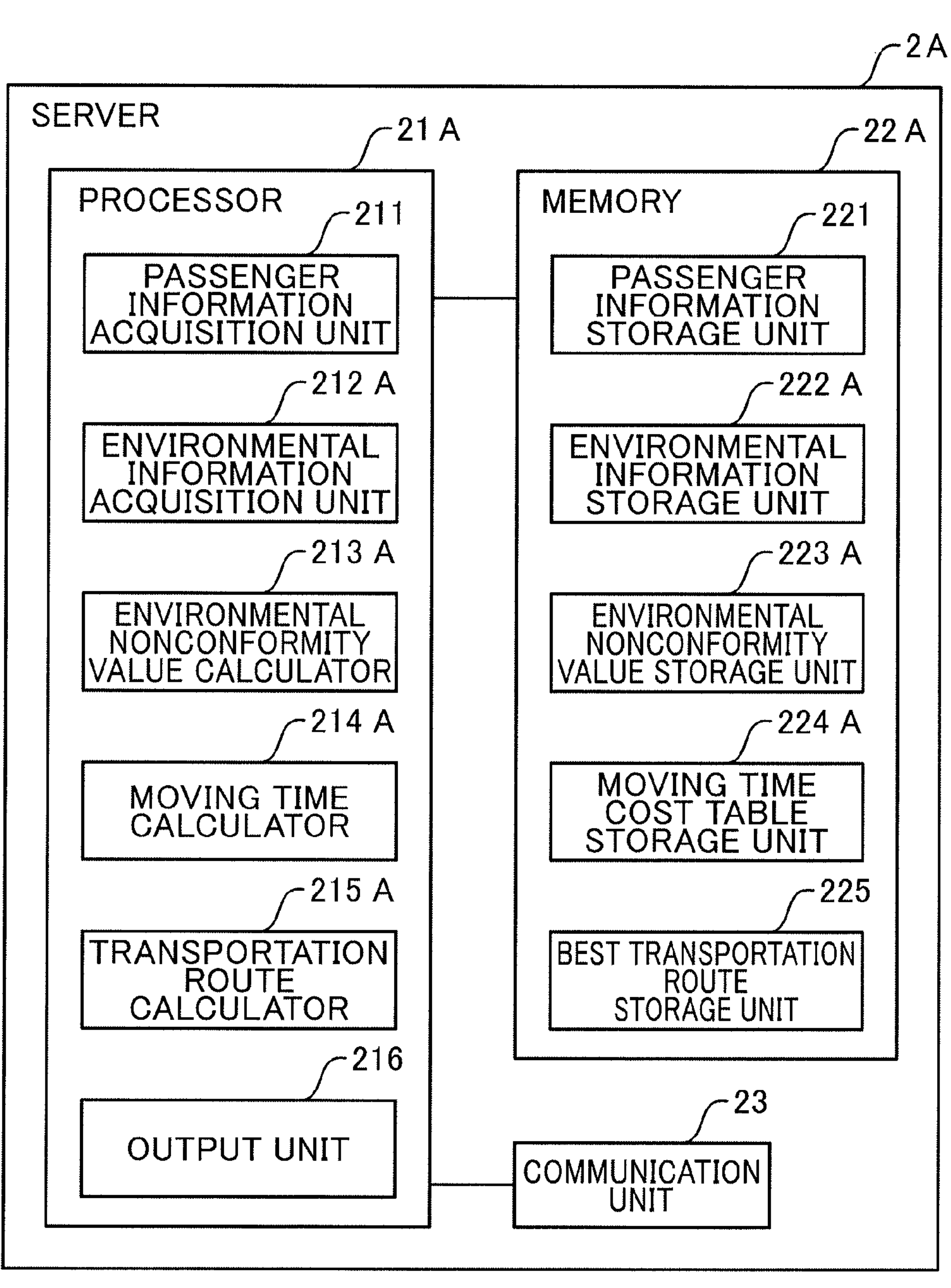
FIG. 8 is a block diagram illustrating a configuration of a server according to a second embodiment.

FIG. 8 is a block diagram illustrating a configuration of a server 2A according to the second embodiment.

The server 2A includes a processor 21A, a memory 22A, and a communication unit 23. In the second embodiment, the same components as those in the first embodiment are denoted by the same reference signs, and description thereof will be omitted.

The processor 21A implements a passenger information acquisition unit 211, an environmental information acquisition unit 212A, an environmental nonconformity value calculator 213A, a moving time calculator 214A, a transportation route calculator 215A, and an output unit 216.

The memory 22A implements a passenger information storage unit 221, an environmental information storage unit 222A, an environmental nonconformity value storage unit 223A, a moving time cost table storage unit 224A, and a best transportation route storage unit 225.

The environmental information acquisition unit 212A acquires environmental information at predetermined time intervals. The predetermined time is 10 minutes, for example. The environmental information acquisition unit 212A acquires environmental information at the predetermined time intervals from an arrival time at the waiting place.

The environmental information acquisition unit 212A acquires the environmental information indicating the environment of the waiting place at the predetermined time intervals from an external server via the communication unit 23. The environmental information acquisition unit 212A transmits position information on the waiting place acquired by the passenger information acquisition unit 211 to the external server via the communication unit 23. Upon receiving the position information on the waiting place transmitted by the server 2A, the external server transmits environmental information indicating the environment of the waiting place at the predetermined time intervals to the server 2A. The communication unit 23 receives the environmental information at the predetermined time intervals, transmitted by the external server. For example, the environmental information includes temperature, weather, and concentration of fine particulate matter (PM 2.5) at the waiting place. The environmental information may include at least one of the temperature, the humidity, the weather, and the concentration of fine particulate matter at the waiting place. The environmental information acquisition unit 212A stores the environmental information at the predetermined time intervals, which is received by the communication unit 23 and associated with the waiting place, in the environmental information storage unit 222A.

The environmental information storage unit 222A stores the environmental information at the predetermined time intervals in association with the waiting place.

Figure 9:
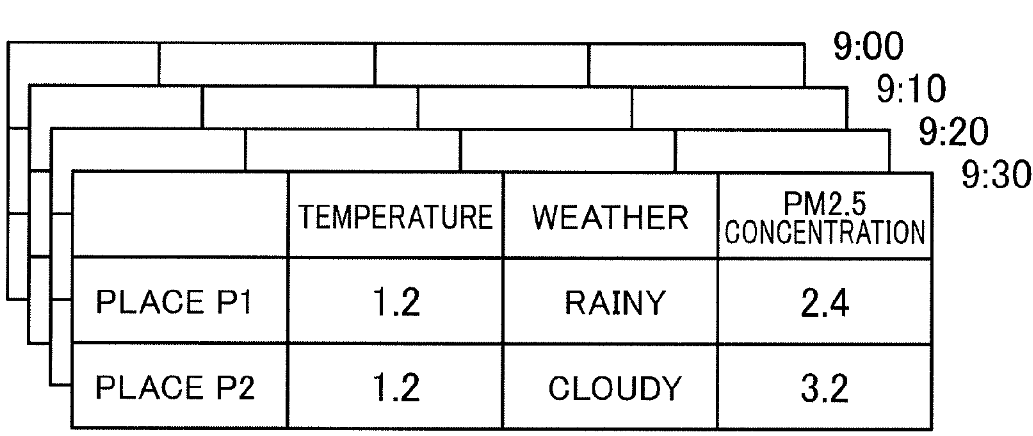
FIG. 9 is a diagram illustrating an example of environmental information at predetermined time intervals stored in an environmental information storage unit according to the second embodiment.

FIG. 9 is a diagram illustrating an example of environmental information at predetermined time intervals stored in the environmental information storage unit 222A according to the second embodiment.

As illustrated in FIG. 9, the environmental information storage unit 222A stores temperature, weather, and PM 2.5 concentration every 10 minutes in association with the waiting place. FIG. 9 illustrates environmental information for every 10 minutes from 9:00 to 9:30 in association with the waiting place. For example, the place P1 of the waiting place at 9:30 has a temperature of 1.2° C., a rainy weather, and a PM 2.5 concentration of 2.4 μg/m$^3$. For example, the place P2 of the waiting place at 9:30 has a temperature of 1.2° C., a cloudy weather, and a PM 2.5 concentration of 3.2 μg/m$^3$.

Even in the second embodiment, the environmental information is not limited to the temperature, the weather, and the concentration of fine particulate matter at the waiting place, and may be other information such as humidity at the waiting place and concentration of photochemical smog at the waiting place, as in the first embodiment.

When the environmental information acquisition unit 212A acquires environmental information from a sensor provided at the waiting place instead of acquiring the environmental information from the external server, future environmental information may be estimated from the acquired environmental information. For example, the environmental information acquisition unit 212A may input the environmental information acquired from the sensor to an estimation model that is machine-learned using environmental information acquired from the sensor in the past, and acquire future environmental information at predetermined time intervals output from the estimation model.

The environmental nonconformity value calculator 213A calculates environmental nonconformity values at the predetermined time intervals based on the environmental information at the predetermined time intervals acquired by the environmental information acquisition unit 212.

The environmental nonconformity value calculator 213A calculates an environmental nonconformity value α at the waiting place at the predetermined time intervals using Equation (1). The environmental nonconformity value calculator 213A stores the calculated environmental nonconformity values at the waiting place at the predetermined time intervals in the environmental nonconformity value storage unit 223A while associating the value with the waiting place.

The environmental nonconformity value storage unit 223A stores the environmental nonconformity values at the predetermined time intervals calculated by the environmental nonconformity value calculator 213A while associating the value with the waiting place.

Figure 10:
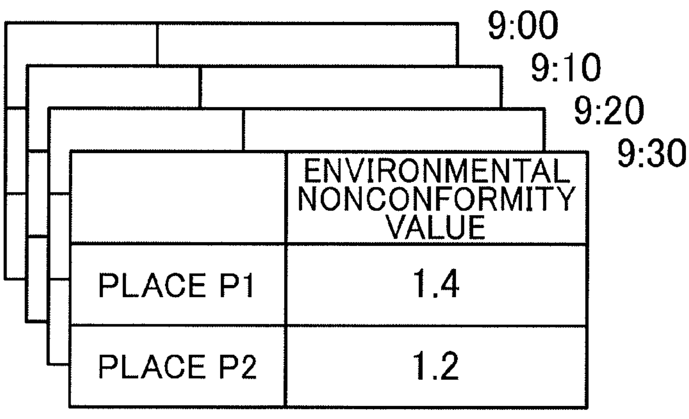
FIG. 10 is a diagram illustrating an example of environmental nonconformity values at predetermined time intervals stored in an environmental nonconformity value storage unit according to the second embodiment.

FIG. 10 is a diagram illustrating an example of environmental nonconformity values at predetermined time intervals stored in the environmental nonconformity value storage unit 223A according to the second embodiment.

As illustrated in FIG. 10, the environmental nonconformity value storage unit 223A stores the environmental nonconformity value every 10 minutes in association with the waiting place. FIG. 10 illustrates the environmental nonconformity value for every 10 minutes from 9:00 to 9:30 in association with the waiting place. For example, the place P1 of the waiting place at 9:30 has an environmental nonconformity value of 1.4, and the place P2 of the waiting place at 9:30 has an environmental nonconformity value of 1.2.

The moving time calculator 214A calculates moving times of all combinations of the waiting place, the destination place, and the current position of the on-demand vehicle, in which one of the waiting place, the destination place, and the current position of the on-demand vehicle is set as a start point and the other is set as an end point, the moving times being calculated for each predetermined period. For example, road conditions change with time due to construction, congestion, and the like. Thus, the moving time calculator 214A calculates the moving times for each predetermined period. The predetermined period is 10 minutes, for example.

The moving time calculator 214A creates a moving time cost table in which the moving times of all the combinations of the waiting place, the destination place, and the current position of the on-demand vehicle, the moving times being calculated for each predetermined period, are represented in a table format, and stores the moving time cost table in the moving time cost table storage unit 224A, the moving time cost table being created for each predetermined period.

The moving time cost table storage unit 224A stores the moving time cost table created for each predetermined period by the moving time calculator 214A, the table representing the moving times of all the combinations of the waiting place, the destination place, and the current position of the on-demand vehicle in a table format for each predetermined period.

FIG. 11 is a diagram illustrating an example of a moving time cost table for each predetermined period stored in the moving time cost table storage unit 224A according to the second embodiment.

FIG. 11 shows that the place P1 is a waiting place of the passenger U1, the place P2 is a waiting place of the passenger U2, the place P3 is a destination place of the passenger U1, and the place P4 is a destination place of the passenger U2. In the moving time cost table, items in a vertical axis represent places to be start points, and items in a horizontal axis represent places to be end points. Each element value in the moving time cost table represents a moving time between places. FIG. 11 illustrates moving time cost tables created for every 10 minutes, including a moving time cost table for a period from 9:00 to 9:10, a moving time cost table for a period from 9:10 to 9:20, a moving time cost table for a period from 9:20 to 9:30, and a moving time cost table for a period from 9:30 to 9:40.

The transportation route calculator 215A calculates an average value of environmental nonconformity values in a period from a time when the passenger arrives at the waiting place to a time when the on-demand vehicle arrives at the waiting place based on the environmental nonconformity values at predetermined time intervals. Then, the transportation route calculator 215A calculates a transportation route so that a waiting time of the passenger at the waiting place decreases as the average value of the environmental nonconformity values increases. At this time, the transportation route calculator 215A weights the waiting time using the average value of the environmental nonconformity values.

More specifically, the transportation route calculator 215A calculates the transportation route of the on-demand vehicle to minimize a sum of the waiting time of the passenger at the waiting place weighted using the average value of the environmental nonconformity values in the period from the time when the passenger arrives at the waiting place to the time when the on-demand vehicle arrives at the waiting place, and a moving time of the passenger to move from the waiting place at which the passenger rides on the on-demand vehicle to the destination place. That is, the transportation route calculator 215A calculates a transportation route to minimize a solution of an objective function f expressed by Equation (3) below.

[Formula 2]

$$f := \sum_{c \in C} \alpha_C(t0, t1) * \text{wait}_C + \text{move}_C \tag{3}$$

In Equation (3), C represents a set of passengers c, $\alpha_c$ (t0, t1) represents an average value of environmental nonconformity values in a period from time t0 at which passengers c arrive at the waiting place to time t1 at which the on-demand vehicle arrives at the waiting place, $wait_c$, represents the waiting time of the passengers c, and $move_c$ represents a vehicle boarding time (moving time) of passengers c.

The transportation route calculator 215A acquires an environmental nonconformity value in the period between the time t0 and the time t1 from the environmental nonconformity value storage unit 223A. For example, when the time t0 is 9:00 and the time t1 is 9:17, the transportation route calculator 215A acquires an environmental nonconformity value at 9:00 and an environmental nonconformity value at 9:10 from the environmental nonconformity value storage unit 223A. The transportation route calculator 215A calculates an average value of the two acquired environmental nonconformity values. A transportation route calculation method in the second embodiment is the same as the transportation route calculation method in the first embodiment except that the average value $\alpha_c$ (t0, t1) of the environmental nonconformity values at the waiting place of the passengers c is used. Additionally, a method for creating a transportation route using multiple moving time cost tables is disclosed in the document, "Time Dependent Vehicle Routing Problems: Formulations, Properties and Heuristic Algorithms" (Chryssi Malandraki et al., Transportation Science, August 1992, Vol. 26, No. 3, p. 185 to 200), for example.

Subsequently, transportation route creation processing of the server 2A according to the second embodiment of the present disclosure will be described.

FIG. 12 is a flowchart for illustrating the transportation route creation processing of the server 2A according to the second embodiment of the present disclosure.

Processing in step S21 is the same as the processing in step S1 illustrated in FIG. 7, and thus description thereof will be omitted.

In subsequent step S22, the environmental information acquisition unit 212A acquires the environmental information on the waiting place at predetermined time intervals from the external server, the environmental information being acquired by the passenger information acquisition unit 211.

In subsequent step S23, the environmental nonconformity value calculator 213A calculates environmental nonconformity values at the waiting place at the predetermined time intervals based on the environmental information at the predetermined time intervals acquired by the environmental information acquisition unit 212A.

In subsequent step S24, the moving time calculator 214A calculates moving times of all combinations of the waiting place, the destination place, and the current position of the on-demand vehicle acquired by the passenger information acquisition unit 211, for each predetermined period, and creates a moving time cost table for each predetermined period, in which the calculated moving times of all the combinations are represented in a table format for each predetermined period.

Processing in step S25 is the same as the processing in step S5 illustrated in FIG. 7, and thus description thereof will be omitted.

In subsequent step S26, the transportation route calculator 215A calculates a cost value of the created latest transportation route. The transportation route calculator 215A calculates the cost value of the latest transportation route using Equation (3). Specifically, the transportation route calculator 215A calculates not only a waiting time at the waiting place of the latest transportation route using the moving time cost table for each predetermined period, but also a moving time from the waiting place to the destination place of the latest transportation route. Then, the transportation route calculator 215 calculates the cost value by totaling the waiting time weighted using the average value of the environmental nonconformity values in the period from the time when the passenger arrives at the waiting place to the time when the mobile body arrives at the waiting place and the moving time for moving from the waiting place to the destination place. The transportation route calculator 215 first calculates a cost value of the created initial transportation route.

Processing in steps S27 to S31 is the same as the processing in steps S7 to S11 illustrated in FIG. 7, and thus description thereof will be omitted.

As described above, the environment of the waiting place may change as time elapses. Thus, the environmental information at the predetermined time intervals is acquired, and the environmental nonconformity values at the predetermined time intervals are calculated based on the environmental information at the predetermined time intervals, so that the environmental nonconformity values changing at the predetermined time intervals can be acquired. Then, the transportation route can be calculated in consideration of the environment of the waiting place that changes at the predetermined time intervals by weighting the waiting time using the average value of the environmental nonconformity values in the period from the time when the passenger arrives at the waiting place to the time when the on-demand vehicle arrives at the waiting place.

Third Embodiment

In the first embodiment, the waiting place is designated by a passenger. In contrast, a third embodiment prompts a passenger to move from a current waiting place to a recommended waiting place when the recommended waiting place improved in environmental nonconformity value exists near the current waiting place designated by the passenger.

Figure 13:
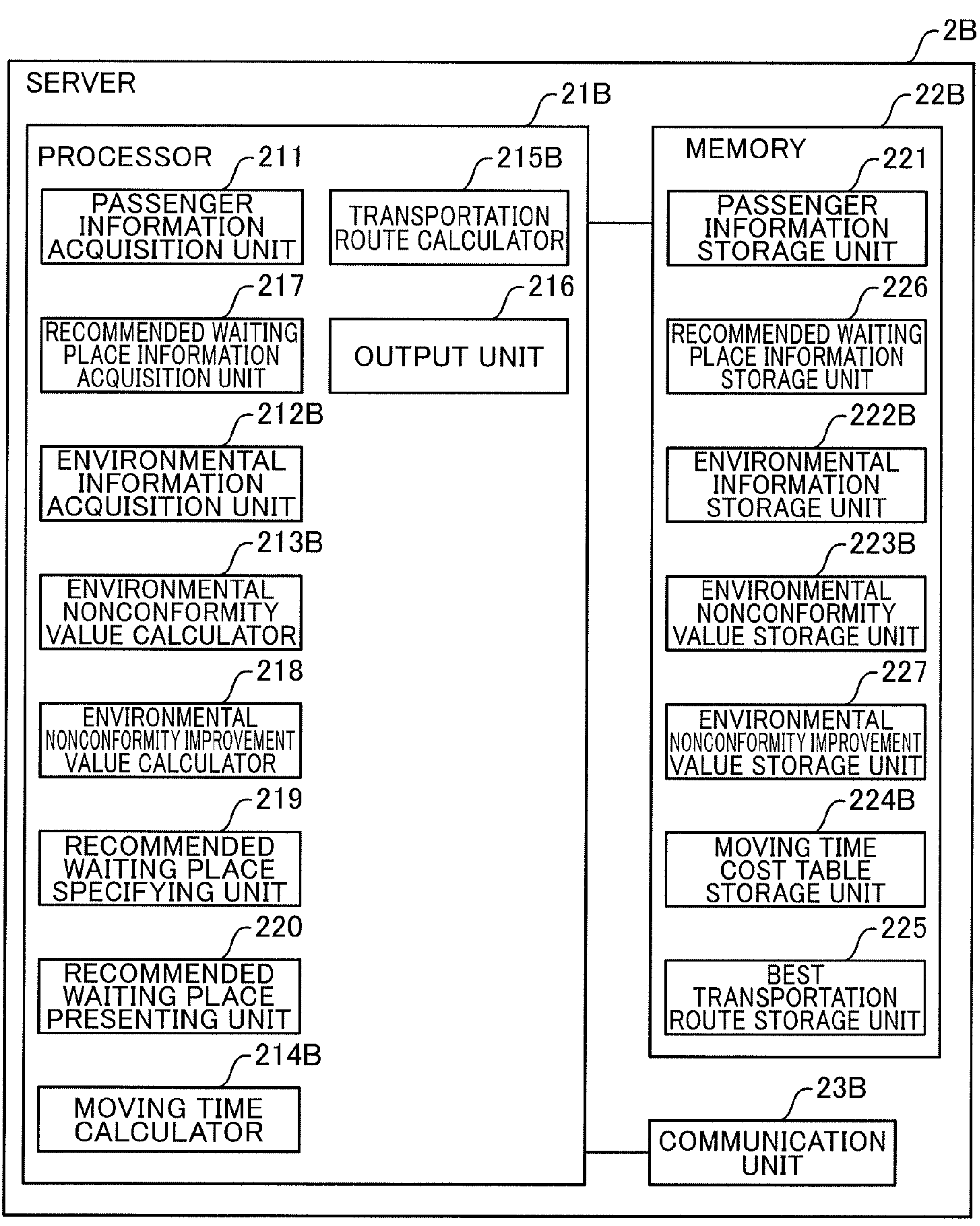
FIG. 13 is a block diagram illustrating a configuration of a server according to a third embodiment.

FIG. 13 is a block diagram illustrating a configuration of a server 2B according to the third embodiment.

The server 2B includes a processor 21B, a memory 22B, and a communication unit 23B. In the third embodiment, the same components as those in the first embodiment are denoted by the same reference signs, and description thereof will be omitted.

The processor 21B implements a passenger information acquisition unit 211, an environmental information acquisition unit 212B, an environmental nonconformity value calculator 213B, a moving time calculator 214B, a transportation route calculator 215B, an output unit 216, a recommended waiting place information acquisition unit 217, an environmental nonconformity improvement value calculator 218, a recommended waiting place specifying unit 219, and a recommended waiting place presenting unit 220.

The memory 22A implements a passenger information storage unit 221, an environmental information storage unit 222B, an environmental nonconformity value storage unit 223B, a moving time cost table storage unit 224B, a best transportation route storage unit 225, a recommended waiting place information storage unit 226, and an environmental nonconformity improvement value storage unit 227.

The recommended waiting place information storage unit 226 preliminarily stores recommended waiting place information indicating a position of at least one recommended waiting place. The recommended waiting place is a place with a roof, a place where the temperature in the building is kept constant, or the like. The recommended waiting place is preliminarily determined as a place where environment can be improved.

FIG. 14 is a diagram illustrating an example of recommended waiting place information stored in the recommended waiting place information storage unit 226 according to the third embodiment.

As illustrated in FIG. 14, the recommended waiting place information storage unit 226 stores recommended waiting place information on at least one recommended waiting place. For example, the recommended waiting place information storage unit 226 stores recommended waiting place information on three recommended waiting places of a place R1, a place R2, and a place R3.

The recommended waiting place information acquisition unit 217 acquires recommended waiting place information from the recommended waiting place information storage unit 226, the recommended waiting place information being on at least one recommended waiting place within a predetermined distance from the waiting place of the passenger.

The environmental information acquisition unit 212B acquires not only the environmental information on the waiting place acquired by the passenger information acquisition unit 211, but also the environmental information on at least one recommended waiting place acquired by the recommended waiting place information acquisition unit 217.

The environmental information on the waiting place is acquired as in the first embodiment.

The environmental information acquisition unit 212B acquires environmental information indicating environment of the at least one recommended waiting place from an external server via the communication unit 23B. The environmental information acquisition unit 212B transmits position information on the at least one recommended waiting place acquired by the recommended waiting place information acquisition unit 217 to the external server via the communication unit 23B. Upon receiving the position information on the at least one recommended waiting place transmitted by the server 2B, the external server transmits environmental information indicating the environment of the at least one recommended waiting place to the server 2B. The communication unit 23B receives the environmental information transmitted by the external server. For example, the environmental information includes temperature, weather, and concentration of fine particulate matter (PM 2.5) at the waiting place. The environmental information may include at least one of the temperature, the humidity, the weather, and the concentration of fine particulate matter at the waiting place. The environmental information acquisition unit 212B stores the environmental information, which is received by the communication unit 23B and associated with the at least one recommended waiting place, in the environmental information storage unit 222B.

The environmental information storage unit 222B stores not only the environmental information in association with the waiting place, but also the environmental information in association with the recommended waiting place.

FIG. 15 is a diagram illustrating an example of environmental information of a recommended waiting place stored in the environmental information storage unit 222B according to the third embodiment. The environmental information on the waiting place stored in the environmental information storage unit 222B is the same as the environmental information illustrated in FIG. 4.

As illustrated in FIG. 15, the environmental information storage unit 222B stores temperature, weather, and PM 2.5 concentration in association with the recommended waiting place. For example, the place R1 of the recommended waiting place has a temperature of 8.2° C., rainy weather, and a PM 2.5 concentration of 2.1 $\mu g/m^3$. For example, the place R2 of the recommended waiting place has a temperature of 11.5° C., cloudy weather, and a PM 2.5 concentration of 3.4 $\mu g/m^3$. For example, the place R3 of the recommended waiting place has a temperature of 10.9° C., cloudy weather, and a PM 2.5 concentration of 2.1 $\mu g/m^3$.

Even in the third embodiment, the environmental information is not limited to the temperature, the weather, and the concentration of fine particulate matter at the waiting place, and may be other information such as humidity at the waiting place and concentration of photochemical smog at the waiting place, as in the first embodiment.

When the environmental information acquisition unit 212B acquires environmental information from a sensor provided at the recommended waiting place instead of acquiring the environmental information from the external server, future environmental information may be estimated from the acquired environmental information. For example, the environmental information acquisition unit 212B may input the environmental information acquired from the sensor to an estimation model that is machine-learned using environmental information acquired from the sensor in the past, and acquire future environmental information at predetermined time intervals output from the estimation model.

The environmental nonconformity value calculator 213B calculates not only an environmental nonconformity value at the waiting place based on the environmental information on the waiting place, but also an environmental nonconformity value at the at least one recommended waiting place based on the environmental information on the at least one recommended waiting place. The environmental nonconformity value calculator 213B calculates environmental nonconformity values a at the waiting place and the recommended waiting place using Equation (1).

The environmental nonconformity value calculator 213B stores not only the corresponding one of the calculated environmental nonconformity values in the environmental nonconformity value storage unit 223B while associating the one value with the waiting place, but also the other of the calculated environmental nonconformity values in the environmental nonconformity value storage unit 223B while associating the other value with the recommended waiting place.

The environmental nonconformity value storage unit 223B stores not only the one environmental nonconformity value calculated by the environmental nonconformity value calculator 213B and associated with the waiting place, but also the other environmental nonconformity value calculated by the environmental nonconformity value calculator 213B and associated with the recommended waiting place.

FIG. 16 is a diagram illustrating an example of an environmental nonconformity value at a recommended waiting place stored in the environmental nonconformity value storage unit 223B according to the third embodiment. The environmental nonconformity value at the waiting place stored in the environmental nonconformity value storage unit 223B is the same as the environmental nonconformity value illustrated in FIG. 5.

As illustrated in FIG. 16, the environmental nonconformity value storage unit 223B stores the environmental nonconformity value in association with the recommended waiting place. For example, the place R1 of the recommended waiting place has an environmental nonconformity value of 0.8, the place R2 of the recommended waiting place has an environmental nonconformity value of 0.4, and the place R3 of the recommended waiting place has an environmental nonconformity value of 0.9.

The environmental nonconformity improvement value calculator 218 calculates an environmental nonconformity improvement value of at least one type to be improved by moving from the waiting place to each of the at least one recommended waiting place based on the environmental nonconformity value at the waiting place, the environmental nonconformity value at the at least one recommended waiting place, and a moving time from the waiting place to the at least one recommended waiting place.

The environmental nonconformity improvement value calculator 218 calculates the environmental nonconformity improvement value of the at least one type by using Equation (4) below.

$$\Delta(c,r)=U_c-U_r-M \tag{4}$$

In Equation (4), Δ(c, r) represents an environmental nonconformity improvement value improved when a passenger moves from a current waiting place c to a recommended waiting place r, $U_c$ represents an environmental nonconformity value at the current waiting place c, $U_r$ represents an environmental nonconformity value at the recommended waiting place r, and M represents a moving time from the current waiting place c to the recommended waiting place r, the moving time being multiplied by $(U_c+U_r)/2$.

The environmental nonconformity improvement value calculator 218 stores the calculated environmental nonconformity improvement value of the at least one type in the environmental nonconformity improvement value storage unit 227.

The environmental nonconformity improvement value storage unit 227 stores the environmental nonconformity improvement value of the at least one type calculated by the environmental nonconformity improvement value calculator 218.

FIG. 17 is a diagram illustrating an example of an environmental nonconformity improvement value stored in the environmental nonconformity improvement value storage unit 227 according to the third embodiment.

As illustrated in FIG. 17, the environmental nonconformity improvement value storage unit 227 stores an environmental nonconformity improvement value in association with each of a current waiting place and at least one recommended waiting place. For example, an environmental nonconformity improvement value of 1.4 is associated with the place P1 of the current waiting place and the place R1 of the recommended waiting place, an environmental nonconformity improvement value of 1.5 is associated with the place P1 of the current waiting place and the place R2 of the recommended waiting place, and an environmental nonconformity improvement value of 1.3 is associated with the place P1 of the current waiting place and the place R3 of the recommended waiting place. For example, an environmental nonconformity improvement value of 1.2 is associated with the place P2 of the current waiting place and the place R1 of the recommended waiting place, an environmental nonconformity improvement value of 4.2 is associated with the place P2 of the current waiting place and the place R2 of the recommended waiting place, and an environmental nonconformity improvement value of 3.2 is associated with the place P2 of the current waiting place and the place R3 of the recommended waiting place.

The recommended waiting place specifying unit 219 specifies a recommended waiting place associated with an environmental nonconformity improvement value that is maximum and equal to or more than a threshold among environmental nonconformity improvement values of the at least one type. When the current waiting place is the place P1 and the threshold is 1.0, for example, the recommended waiting place specifying unit 219 specifies the place R2 in FIG. 17 as a recommended waiting place, the place R2 being associated with the environmental nonconformity improvement value of 1.5 that is equal to or more than the threshold and maximum among the three environmental nonconformity improvement values.

The recommended waiting place presenting unit 220 transmits presentation information to the passenger terminal 1 via the communication unit 23B, the presentation information prompting the passenger to move to the recommended waiting place specified by the recommended waiting place specifying unit 219. Upon receiving the presentation information, the passenger terminal 1 presents the specified recommended waiting place and receives selection of the passenger for whether to accept movement from the current waiting place to the recommended waiting place. Then, the passenger terminal 1 transmits response information to the server 2B, the response information indicating whether the movement from the current waiting place to the recommended waiting place is accepted. The communication unit 23B receives the response information transmitted by the passenger terminal 1, and outputs the received response information to the moving time calculator 214B.

When receiving the response information indicating acceptance of the movement to the recommended waiting place in response to the presentation information, the moving time calculator 214B replaces the current waiting place of the passenger stored in the passenger information storage unit 221 with the specified recommended waiting place. For example, when the passenger U1 accepts the movement from the place P1 of the current waiting place to the place R2 of the recommended waiting place, the place P1 of the waiting place in the passenger information illustrated in FIG. 3 is replaced with the place R2 of the recommended waiting place.

The moving time calculator 214B calculates moving times of all combinations of the recommended waiting place, the destination place, and the current position of the on-demand vehicle, in which one of the recommended waiting place, the destination place, and the current position of the on-demand vehicle is set as a start point and the other is set as an end point. The moving time calculator 214B creates a moving time cost table in which the calculated moving times of all the combinations of the recommended waiting place, the destination place, and the current position of the on-demand vehicle are represented in a table format, and stores the created moving time cost table in the moving time cost table storage unit 224B.

The moving time cost table storage unit 224B stores the moving time cost table created by the moving time calculator 214B, the table representing the moving times of all the combinations of the recommended waiting place, the destination place, and the current position of the on-demand vehicle in a table format.

FIG. 18 is a diagram illustrating an example of a moving time cost table stored in the moving time cost table storage unit 224B according to the third embodiment.

FIG. 18 shows that the place R2 is a recommended waiting place of the passenger U1, the place P2 is a waiting place of the passenger U2, the place P3 is a destination place of the passenger U1, and the place P4 is a destination place of the passenger U2. The place P1 of the current waiting place of the passenger U1 is changed to the place R2 of the recommended waiting place. In the moving time cost table, items in a vertical axis represent places to be start points, and items in a horizontal axis represent places to be end points. Each element value in the moving time cost table represents a moving time between places.

When receiving the response information indicating acceptance of the movement to the recommended waiting place in response to the presentation information, the transportation route calculator 215B calculates a transportation route in which the waiting time of the passenger at the recommended waiting place decreases as the environmental nonconformity value at the specified recommended waiting place increases.

More specifically, when receiving the response information indicating acceptance of the movement to the recommended waiting place in response to the presentation information, the transportation route calculator 215B calculates a transportation route to minimize a sum of the waiting time of the passenger at the recommended waiting place, the waiting time being weighted using the environmental nonconformity value at the recommended waiting place specified, and the moving time of the passenger to move from the recommended waiting place at which the passenger rides on the on-demand vehicle to the destination place.

The transportation route calculator 215B creates a transportation route satisfying restriction conditions that a time at which the on-demand vehicle picks up the passenger moving from the current waiting place to the recommended waiting place is after an arrival time of the passenger at the recommended waiting place.

When receiving the response information indicating acceptance of the movement to the recommended waiting place in response to the presentation information, the moving time calculator 214B may replace an arrival time of the passenger at the current waiting place stored in the passenger information storage unit 221 with the arrival time at the specified recommended waiting place. For example, when the passenger U1 accepts the movement from the place P1 of the current waiting place to the place R2 of the recommended waiting place, not only the place P1 of the waiting place in the passenger information illustrated in FIG. 3 is replaced with the place R2 of the recommended waiting place, but also the arrival time at the current waiting place may be replaced with the arrival time at the recommended waiting place. As described above, the arrival time at the waiting place is replaced with the arrival time at the recommended waiting place, and the moving time cost table is created using the replaced arrival time at the recommended waiting place, so that the restriction conditions above can be satisfied.

In contrast, when receiving the response information indicating non-acceptance of the movement to the recommended waiting place in response to the presentation information, the transportation route calculator 215B calculates a transportation route to minimize a sum of the waiting time of the passenger at the waiting place, the waiting time being weighted using the environmental nonconformity value at the waiting place, and the moving time of the passenger to move from the waiting place at which the passenger rides on the on-demand vehicle to the destination place.

A transportation route calculation method in the third embodiment is the same as the transportation route calculation method in the first embodiment except for the restriction conditions that the time when the on-demand vehicle picks up the passenger is after the arrival time of the passenger at the recommended waiting place.

Subsequently, transportation route creation processing of the server 2B according to the third embodiment of the present disclosure will be described.

Figure 19:
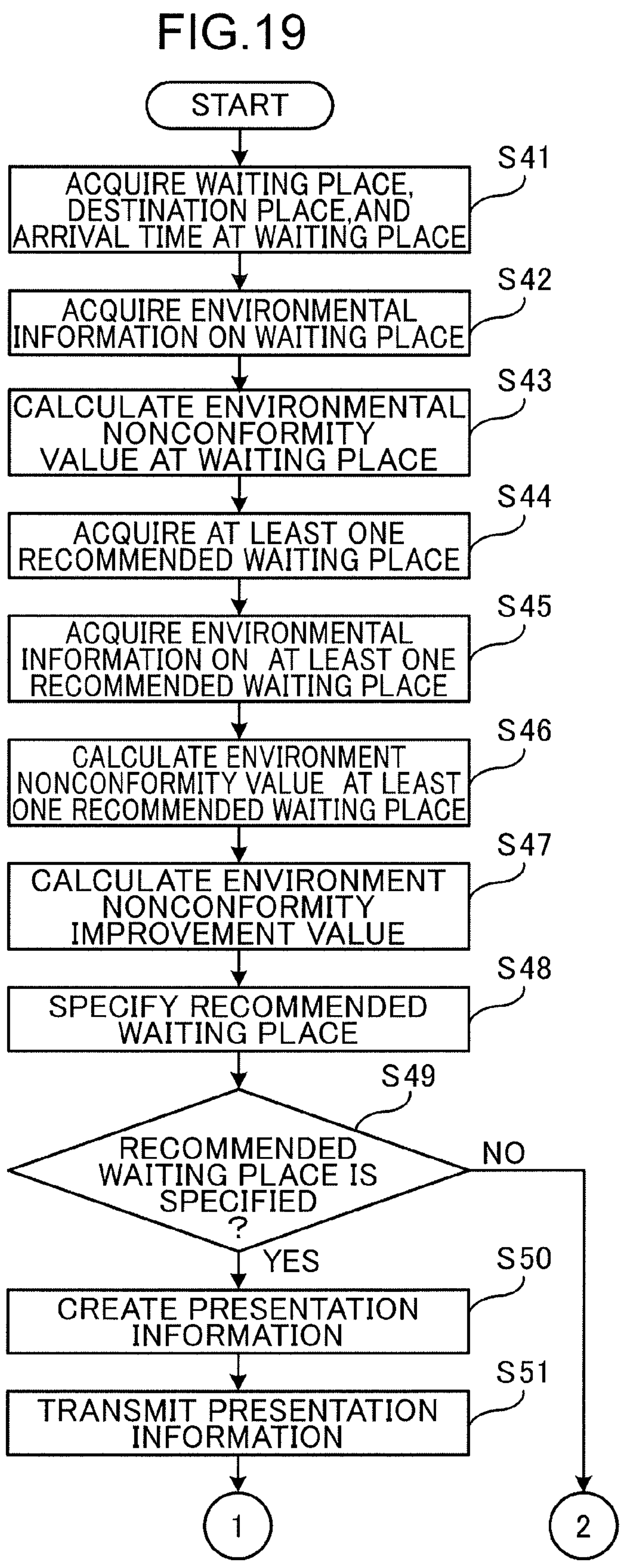
FIG. 19 is a first flowchart for illustrating transportation route creation processing of the server according to the third embodiment of the present disclosure.
Figure 20:
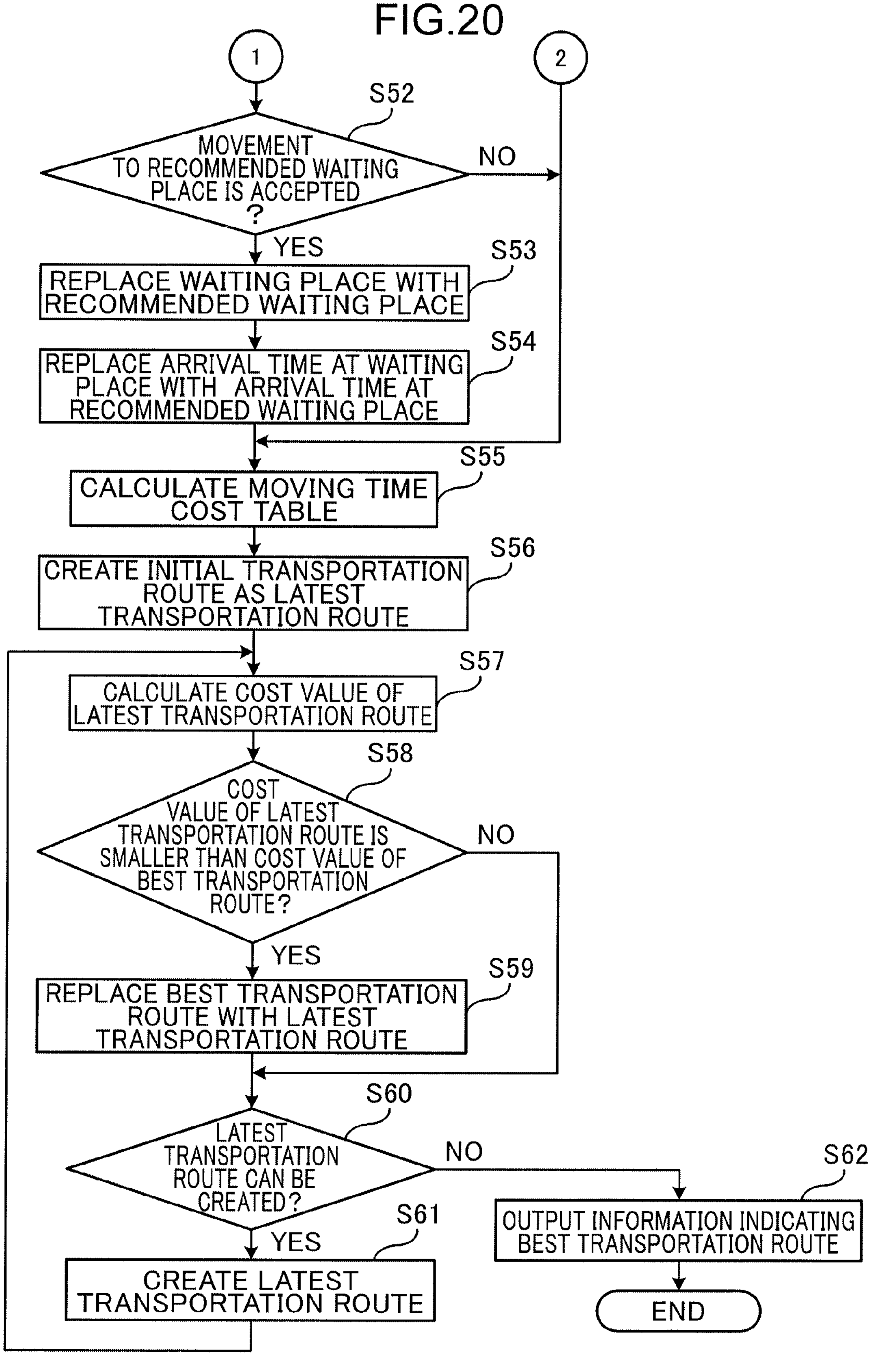
FIG. 20 is a second flowchart for illustrating the transportation route creation processing of the server according to the third embodiment of the present disclosure.

FIG. 19 is a first flowchart for illustrating the transportation route creation processing of the server 2B according to the third embodiment of the present disclosure. FIG. 20 is a second flowchart for illustrating the transportation route creation processing of the server 2B according to the third embodiment of the present disclosure.

Processing in steps S41 to S43 is the same as the processing in steps S1 to S3 illustrated in FIG. 7, and thus description thereof will be omitted.

In subsequent step S44, the recommended waiting place information acquisition unit 217 acquires at least one recommended waiting place within a predetermined distance from the waiting place of the passenger from the recommended waiting place information storage unit 226.

In subsequent step S45, the environmental information acquisition unit 212B acquires environmental information indicating environment of the at least one recommended waiting place acquired by the recommended waiting place information acquisition unit 217 from the external server.

In subsequent step S46, the environmental nonconformity value calculator 213B calculates an environmental nonconformity value at the at least one recommended waiting place based on the environmental information acquired by the environmental information acquisition unit 212B.

Although the environmental information acquisition unit 212B acquires the environmental information on the current waiting place and the environmental information on the at least one recommended waiting place in individual steps, the present disclosure is not particularly limited thereto, and the environmental information on the current waiting place and the environmental information on the at least one recommended waiting place may be acquired in one step. Similarly, the environmental nonconformity value calculator 213B may calculate the environmental nonconformity value at the current waiting place and the environmental nonconformity value at the at least one recommended waiting place in one step.

In subsequent step S47, the environmental nonconformity improvement value calculator 218 calculates an environmental nonconformity improvement value of at least one type to be improved by moving from the current waiting place to each of the at least one recommended waiting place based on the environmental nonconformity value at the current waiting place, the environmental nonconformity value at the at least one recommended waiting place, and a moving time from the current waiting place to the at least one recommended waiting place. The environmental nonconformity improvement value calculator 218 calculates the environmental nonconformity improvement value of the at least one type by using Equation (4). The environmental nonconformity improvement value calculator 218 also stores the calculated environmental nonconformity improvement value of the at least one type in the environmental nonconformity improvement value storage unit 227.

In subsequent step S48, the recommended waiting place specifying unit 219 specifies a recommended waiting place associated with an environmental nonconformity improvement value that is maximum and equal to or more than a threshold among environmental nonconformity improvement values of the at least one type. The recommended waiting place specifying unit 219 extracts the maximum environmental nonconformity improvement value from the environmental nonconformity improvement values of the at least one type, and specifies a recommended waiting place to be presented to a passenger, the recommended waiting place being associated with the extracted maximum environmental nonconformity improvement value when the extracted maximum environmental nonconformity improvement value is equal to or more than a threshold. When the maximum environmental nonconformity improvement value is smaller than the threshold, the recommended waiting place specifying unit 219 does not specify the recommended waiting place to be presented to the passenger.

In subsequent step S49, the recommended waiting place presenting unit 220 determines whether a recommended waiting place is specified by the recommended waiting place specifying unit 219. Here, when it is determined that the recommended waiting place is not specified (NO in step S49), the processing proceeds to step S54.

In contrast, when it is determined that the recommended waiting place is specified (YES in step S49), the recommended waiting place presenting unit 220 in step S50 creates presentation information for prompting the passenger to move to the recommended waiting place specified by the recommended waiting place specifying unit 219.

In subsequent step S51, the recommended waiting place presenting unit 220 transmits the created presentation information to the passenger terminal 1 via the communication unit 23B. The passenger terminal 1 receives selection of the passenger for whether to accept the movement from the current waiting place to the recommended waiting place, and transmits response information indicating whether to accept the movement from the current waiting place to the recommended waiting place to the server 2B.

In subsequent step S52, the moving time calculator 214B determines whether the movement from the current waiting place to the recommended waiting place is accepted based on the response information received by the communication unit 23B. Here, when it is determined that the movement from the current waiting place to the recommended waiting place is not accepted (NO in step S52), the processing proceeds to step S54. When the response information indicating that the movement to the recommended waiting place is not accepted is received in response to the presentation information, it is determined that the movement from the current waiting place to the recommended waiting place is not accepted. Even when the response information is not received within a predetermined time after the presentation information is transmitted, it is determined that the movement from the current waiting place to the recommended waiting place is not accepted.

In contrast, when it is determined that the movement from the current waiting place to the recommended waiting place is accepted (YES in step S52), the moving time calculator 214B in step S53 replaces the current waiting place of the passenger stored in the passenger information storage unit 221 with the specified recommended waiting place. When the response information indicating that the movement to the recommended waiting place is accepted is received in response to the presentation information, it is determined that the movement from the current waiting place to the recommended waiting place is accepted.

In subsequent step S54, the moving time calculator 214B replaces the arrival time of the passenger at the current waiting place stored in the passenger information storage unit 221 with the arrival time at the specified recommended waiting place. When the passenger requests dispatch after arriving at the waiting place, the moving time calculator 214B calculates the moving time from the current waiting place to the recommended waiting place, and calculates the arrival time at the recommended waiting place by adding the calculated moving time to the current time. In contrast, when the passenger reserves dispatch in advance, the moving time calculator 214B calculates the moving time from the current waiting place to the recommended waiting place, and calculates the arrival time at the recommended waiting place by adding the calculated moving time to the arrival time at the current waiting place.

When multiple passengers request dispatch, the processing in steps S41 to S54 is performed on each of the multiple passengers.

In subsequent step S55, the moving time calculator 214B calculates moving times of all combinations of the waiting place acquired by the passenger information acquisition unit 211 or the recommended waiting place specified by the recommended waiting place specifying unit 219, the destination place, and the current position of the on-demand vehicle, and creates a moving time cost table in which the calculated moving times of all the combinations are represented in a table format.

Processing in steps S56 to S62 is the same as the processing in steps S5 to S11 illustrated in FIG. 7, and thus description thereof will be omitted.

As described above, the recommended waiting place in environment improved from the environment of the current waiting place is specified, and the specified recommended waiting place is presented to the passenger. Then, when the response information indicating acceptance of the movement to the recommended waiting place is received, the transportation route is calculated to minimize a sum of the waiting time of the passenger at the recommended waiting place, the waiting time being weighted using the environmental nonconformity value at the recommended waiting place specified, and the moving time of the passenger to move from the recommended waiting place at which the passenger rides on the on-demand vehicle to the destination place. Thus, the passenger can be prompted to move to the recommended waiting place in environment more comfortable than the environment of the current waiting place, and the passenger can wait in a more comfortable environment by moving to the recommended waiting place.

Fourth Embodiment

In the third embodiment, temporal change in environment of each of the waiting place and the recommended waiting place is not considered. In contrast, a fourth embodiment causes an environmental nonconformity value at each of the waiting place and the recommended waiting place at predetermined time intervals to be calculated in consideration of change in environment of each of the waiting place and the recommended waiting place at the predetermined time intervals.

As described in the second embodiment, temperature, weather, and concentration of PM 2.5, for example, change as time elapses, so that an environmental nonconformity value also changes as time elapses. It takes time for a passenger to move from the current waiting place to the recommended waiting place. For this reason, the environmental nonconformity value may change from moment to moment even during the movement from the current waiting place to the recommended waiting place.

For example, when it will rain 10 minutes later at the current waiting place, the passenger may be satisfied more when moving to a somewhat comfortable recommended waiting place that is relatively close than moving to a very comfortable recommended waiting place that is relatively far away.

Thus, the fourth embodiment causes the recommended waiting place to be specified in consideration of environment of the current waiting place and environment of the recommended waiting place after the movement.

Figure 21:
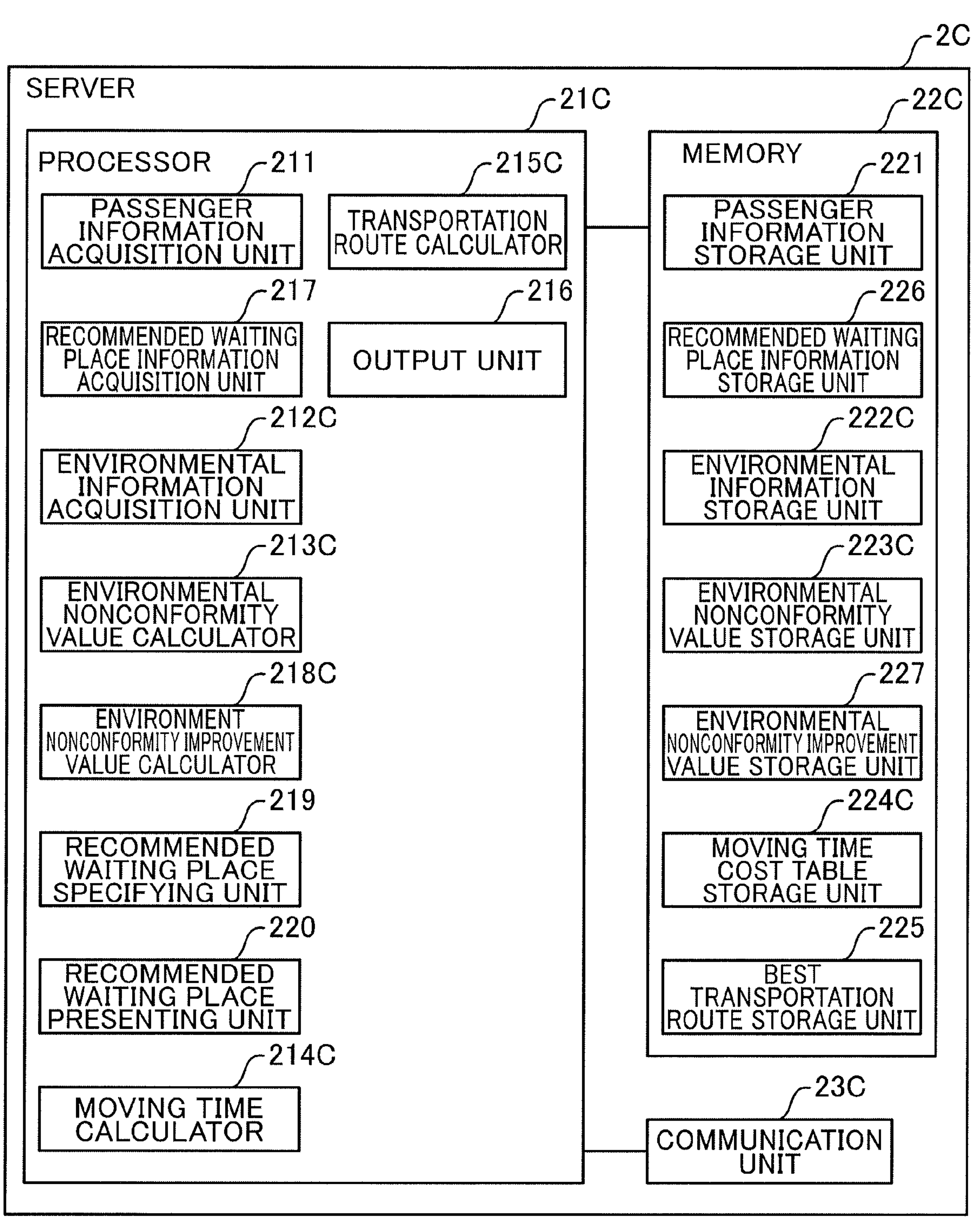
FIG. 21 is a block diagram illustrating a configuration of a server according to a fourth embodiment.

FIG. 21 is a block diagram illustrating a configuration of a server 2C according to the fourth embodiment.

The server 2C includes a processor 21C, a memory 22C, and a communication unit 23C. In the fourth embodiment, the same components as those in the first embodiment to the third embodiment are denoted by the same reference numerals, and description thereof will be omitted.

The processor 21C implements a passenger information acquisition unit 211, an environmental information acquisition unit 212C, an environmental nonconformity value calculator 213C, a moving time calculator 214C, a transportation route calculator 215C, an output unit 216, a recommended waiting place information acquisition unit 217, an environmental nonconformity improvement value calculator 218C, a recommended waiting place specifying unit 219, and a recommended waiting place presenting unit 220.

The memory 22C implements a passenger information storage unit 221, an environmental information storage unit 222C, an environmental nonconformity value storage unit 223C, a moving time cost table storage unit 224C, a best transportation route storage unit 225, a recommended waiting place information storage unit 226, and an environmental nonconformity improvement value storage unit 227.

The environmental information acquisition unit 212C acquires not only the environmental information on the waiting place at predetermined time intervals acquired by the passenger information acquisition unit 211, but also the environmental information on at least one recommended waiting place at predetermined time intervals acquired by the recommended waiting place information acquisition unit 217. The predetermined time is 10 minutes, for example. The environmental information acquisition unit 212C acquires environmental information on the waiting place and at least one recommended waiting place at the predetermined time intervals from an arrival time at the waiting place.

The environmental information on the waiting place at the predetermined time intervals is acquired as in the second embodiment.

The environmental information acquisition unit 212C acquires environmental information at the predetermined time intervals, indicating environment of the at least one recommended waiting place, from an external server via the communication unit 23C. The environmental information acquisition unit 212C transmits position information on the at least one recommended waiting place acquired by the recommended waiting place information acquisition unit 217 to the external server via the communication unit 23C. Upon receiving the position information on the at least one recommended waiting place transmitted by the server 2C, the external server transmits environmental information at the predetermined time intervals, indicating the environment of the at least one recommended waiting place, to the server 2C. The communication unit 23C receives the environmental information at the predetermined time intervals, transmitted by the external server. For example, the environmental information includes temperature, weather, and concentration of fine particulate matter (PM 2.5) at the waiting place. The environmental information may include at least one of the temperature, the humidity, the weather, and the concentration of fine particulate matter at the waiting place. The environmental information acquisition unit 212C stores the environmental information at the predetermined time intervals, which is received by the communication unit 23C and associated with the at least one recommended waiting place, in the environmental information storage unit 222C.

The environmental information storage unit 222C stores not only the environmental information at the predetermined time intervals, in association with the waiting place, but also the environmental information at the predetermined time intervals, in association with the recommended waiting place.

Figure 22:
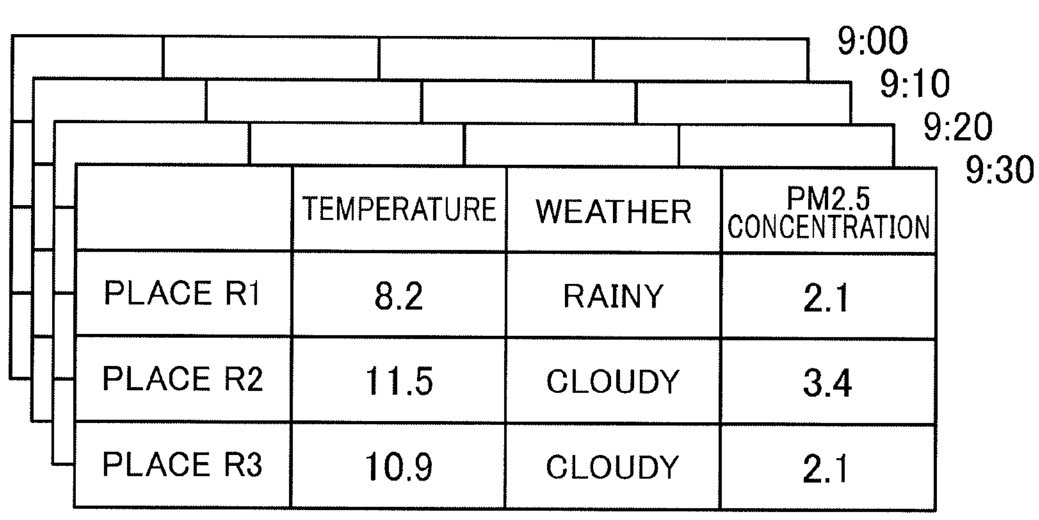
FIG. 22 is a diagram illustrating an example of environmental information at predetermined time intervals at a recommended waiting place stored in an environmental information storage unit according to the fourth embodiment.

FIG. 22 is a diagram illustrating an example of environmental information at predetermined time intervals at a recommended waiting place stored in the environmental information storage unit 222C according to the fourth embodiment.

As illustrated in FIG. 22, the environmental information storage unit 222C stores temperature, weather, and PM 2.5 concentration every 10 minutes in association with the recommended waiting place. FIG. 22 illustrates environmental information for every 10 minutes from 9:00 to 9:30 in association with the recommended waiting place. For example, the place R1 of the recommended waiting place at 9:30 has a temperature of 8.2° C., rainy weather, and a PM 2.5 concentration of 2.1 $\mu g/m^3$. For example, the place R2 of the recommended waiting place at 9:30 has a temperature of 11.5° C., a cloudy weather, and a PM 2.5 concentration of 3.4 $\mu g/m^3$. For example, the place R3 of the recommended waiting place at 9:30 has a temperature of 10.9° C., a cloudy weather, and a PM 2.5 concentration of 2.1 $\mu g/m^3$.

Even in the fourth embodiment, the environmental information is not limited to the temperature, the weather, and the concentration of fine particulate matter at the waiting place, and may be other information such as humidity at the waiting place and concentration of photochemical smog at the waiting place, as in the first embodiment.

When the environmental information acquisition unit 212C acquires environmental information from a sensor provided at the recommended waiting place instead of acquiring the environmental information from the external server, future environmental information may be estimated from the acquired environmental information. For example, the environmental information acquisition unit 212C may input the environmental information acquired from the sensor to an estimation model that is machine-learned using environmental information acquired from the sensor in the past, and acquire future environmental information at predetermined time intervals output from the estimation model.

The environmental nonconformity value calculator 213C calculates not only environmental nonconformity values at the waiting place at the predetermined time intervals based on the environmental information on the waiting place at the predetermined time intervals, but also environmental nonconformity values at the at least one recommended waiting place at the predetermined time intervals based on the environmental information on the at least one recommended waiting place at the predetermined time intervals.

The environmental nonconformity value calculator 213C calculates environmental nonconformity values a at the waiting place and the recommended waiting place at the predetermined time intervals using Equation (1). The environmental nonconformity value calculator 213C stores not only the calculated environmental nonconformity values at the waiting place at the predetermined time intervals in the environmental nonconformity value storage unit 223C while associating the value with the waiting place, but also the calculated environmental nonconformity values at the recommended waiting place at the predetermined time intervals in the environmental nonconformity value storage unit 223C while associating the value with the recommended waiting place.

The environmental nonconformity value storage unit 223C stores not only one of the environmental nonconformity values at the predetermined time intervals calculated by the environmental nonconformity value calculator 213C and associated with the waiting place, but also the other of the environmental nonconformity values at the predetermined time intervals calculated by the environmental nonconformity value calculator 213C and associated with the recommended waiting place.

Figure 23:
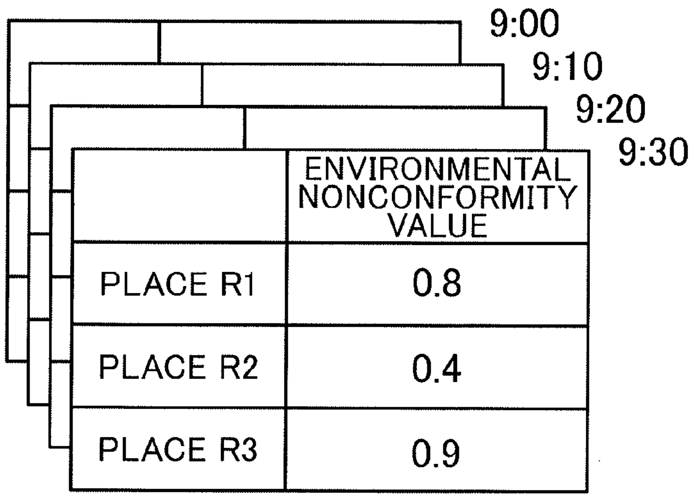
FIG. 23 is a diagram illustrating an example of environmental nonconformity values at a recommended waiting place at predetermined time intervals stored in an environmental nonconformity value storage unit according to the fourth embodiment.

FIG. 23 is a diagram illustrating an example of environmental nonconformity values at a recommended waiting place at the predetermined time intervals stored in the environmental nonconformity value storage unit 223C according to the fourth embodiment. The environmental nonconformity values at the waiting place at the predetermined time intervals stored in the environmental nonconformity value storage unit 223C are the same as the environmental nonconformity values at the predetermined time intervals illustrated in FIG. 10.

As illustrated in FIG. 23, the environmental nonconformity value storage unit 223C stores the environmental nonconformity value every 10 minutes in association with the recommended waiting place. FIG. 23 illustrates the environmental nonconformity value for every 10 minutes from 9:00 to 9:30 in association with the recommended waiting place. For example, the place R1 of the recommended waiting place at 9:30 has an environmental nonconformity value of 0.8, the place R2 of the recommended waiting place has an environmental nonconformity value of 0.4, and the place R3 of the recommended waiting place has an environmental nonconformity value of 0.9.

The environmental nonconformity improvement value calculator 218C calculates an environmental nonconformity improvement value of at least one type to be improved by moving from the waiting place to each of the at least one recommended waiting place based on an environmental nonconformity value at a current time among environmental nonconformity values at the waiting place at predetermined time intervals, an environmental nonconformity value of at least one type at a scheduled arrival time of a passenger among environmental nonconformity values of the at least one type at the at least one recommended waiting place at predetermined time intervals, and a moving time from the waiting place to the at least one recommended waiting place.

The environmental nonconformity improvement value calculator 218C calculates the environmental nonconformity improvement value of the at least one type by using Equation (5) below.

$$\Delta(c,r)=U_c-U_r-M \tag{5}$$

In Equation (5), Δ(c, r) represents an environmental nonconformity improvement value improved when a passenger moves from a current waiting place c to a recommended waiting place r, $U_c$ represents an environmental nonconformity value at the current waiting place c at a current time, $U_r$ represents an environmental nonconformity value at the recommended waiting place r at a predicted arrival time, and M represents a moving time from the current waiting place c to the recommended waiting place r, the moving time being multiplied by $(U_c+U_r)/2$. The predicted arrival time at the recommended waiting place r is calculated by adding a moving time from the current waiting place to the recommended waiting place r to the current time.

The environmental nonconformity improvement value calculator 218C stores the calculated environmental nonconformity improvement value of the at least one type in the environmental nonconformity improvement value storage unit 227. The environmental nonconformity improvement value stored in the environmental nonconformity improvement value storage unit 227 indicates an improvement level of the environmental nonconformity value improved by moving from the current waiting place to the recommended waiting place.

When receiving response information indicating acceptance of the movement to the recommended waiting place in response to presentation information, the moving time calculator 214C replaces the current waiting place of the passenger stored in the passenger information storage unit 221 with the specified recommended waiting place.

The moving time calculator 214C calculates moving times of all combinations of the recommended waiting place, the destination place, and the current position of the on-demand vehicle, in which one of the recommended waiting place, the destination place, and the current position of the on-demand vehicle is set as a start point and the other is set as an end point, the moving times being calculated for each predetermined period. The moving time calculator 214C calculates the moving times for each predetermined period. The predetermined period is 10 minutes, for example.

The moving time calculator 214C creates a moving time cost table in which the moving times of all the combinations of the recommended waiting place, the destination place, and the current position of the on-demand vehicle, the moving times being calculated for each predetermined period, are represented in a table format, and stores the moving time cost table in the moving time cost table storage unit 224C, the moving time cost table being created for each predetermined period.

The moving time cost table storage unit 224C stores the moving time cost table created for each predetermined period by the moving time calculator 214C, the table representing the moving times of all the combinations of the recommended waiting place, the destination place, and the current position of the on-demand vehicle in a table format.

FIG. 24 is a diagram illustrating an example of a moving time cost table for each predetermined period stored in the moving time cost table storage unit 224C according to the fourth embodiment.

FIG. 24 shows that the place R2 is a recommended waiting place of the passenger U1, the place P2 is a waiting place of the passenger U2, the place P3 is a destination place of the passenger U1, and the place P4 is a destination place of the passenger U2. The place P1 of the current waiting place of the passenger U1 is changed to the place R2 of the recommended waiting place. In the moving time cost table, items in a vertical axis represent places to be start points, and items in a horizontal axis represent places to be end points. Each element value in the moving time cost table represents a moving time between places. FIG. 24 illustrates moving time cost tables created for every 10 minutes, including a moving time cost table for a period from 9:00 to 9:10, a moving time cost table for a period from 9:10 to 9:20, a moving time cost table for a period from 9:20 to 9:30, and a moving time cost table for a period from 9:30 to 9:40.

When receiving the response information indicating acceptance of the movement to the recommended waiting place in response to the presentation information, the transportation route calculator 215C calculates an average value of environmental nonconformity values in a period from a time when the passenger arrives at the recommended waiting place to a time when the on-demand vehicle arrives at the recommended waiting place based on environmental nonconformity values at the specified recommended waiting place at predetermined time intervals. Then, the transportation route calculator 215C calculates a transportation route so that a waiting time of the passenger at the recommended waiting place decreases as the average value of the environmental nonconformity values at the specified recommended waiting place increases. At this time, the transportation route calculator 215C weights the waiting time using the average value of the environmental nonconformity values.

More specifically, when receiving the response information indicating acceptance of the movement to the recommended waiting place in response to the presentation information, the transportation route calculator 215C calculates a transportation route to minimize a sum of the waiting time of the passenger at the recommended waiting place, the waiting time being weighted using the average value of the environmental nonconformity values in the period from the time when the passenger arrives at the recommended waiting place to the time when the on-demand vehicle arrives at the recommended waiting place, and the moving time of the passenger to move from the recommended waiting place at which the passenger rides on the on-demand vehicle to the destination place.

The transportation route calculator 215C creates a transportation route satisfying restriction conditions that a time at which the on-demand vehicle picks up the passenger moving from the current waiting place to the recommended waiting place is after an arrival time of the passenger at the recommended waiting place.

When receiving the response information indicating acceptance of the movement to the recommended waiting place in response to the presentation information, the moving time calculator 214C may replace an arrival time of the passenger at the current waiting place stored in the passenger information storage unit 221 with the arrival time at the specified recommended waiting place. The arrival time at the waiting place is replaced with the arrival time at the recommended waiting place, and the moving time cost table is created using the replaced arrival time at the recommended waiting place, so that the restriction conditions above can be satisfied.

In contrast, when receiving the response information indicating non-acceptance of the movement to the recommended waiting place in response to the presentation information, the transportation route calculator 215C calculates a transportation route to minimize a sum of a waiting time of the passenger at the waiting place, the waiting time being weighted using an average value of environmental nonconformity values in a period from a time when the passenger arrives at the waiting place to a time when the on-demand vehicle arrives at the waiting place, and the moving time of the passenger to move from the waiting place at which the passenger rides on the on-demand vehicle to the destination place.

A transportation route calculation method in the fourth embodiment is the same as the transportation route calculation method in the second embodiment except for the restriction conditions that the time when the on-demand vehicle picks up the passenger is after the arrival time of the passenger at the recommended waiting place.

Subsequently, transportation route creation processing of the server 2C according to the fourth embodiment of the present disclosure will be described.

Figure 26:
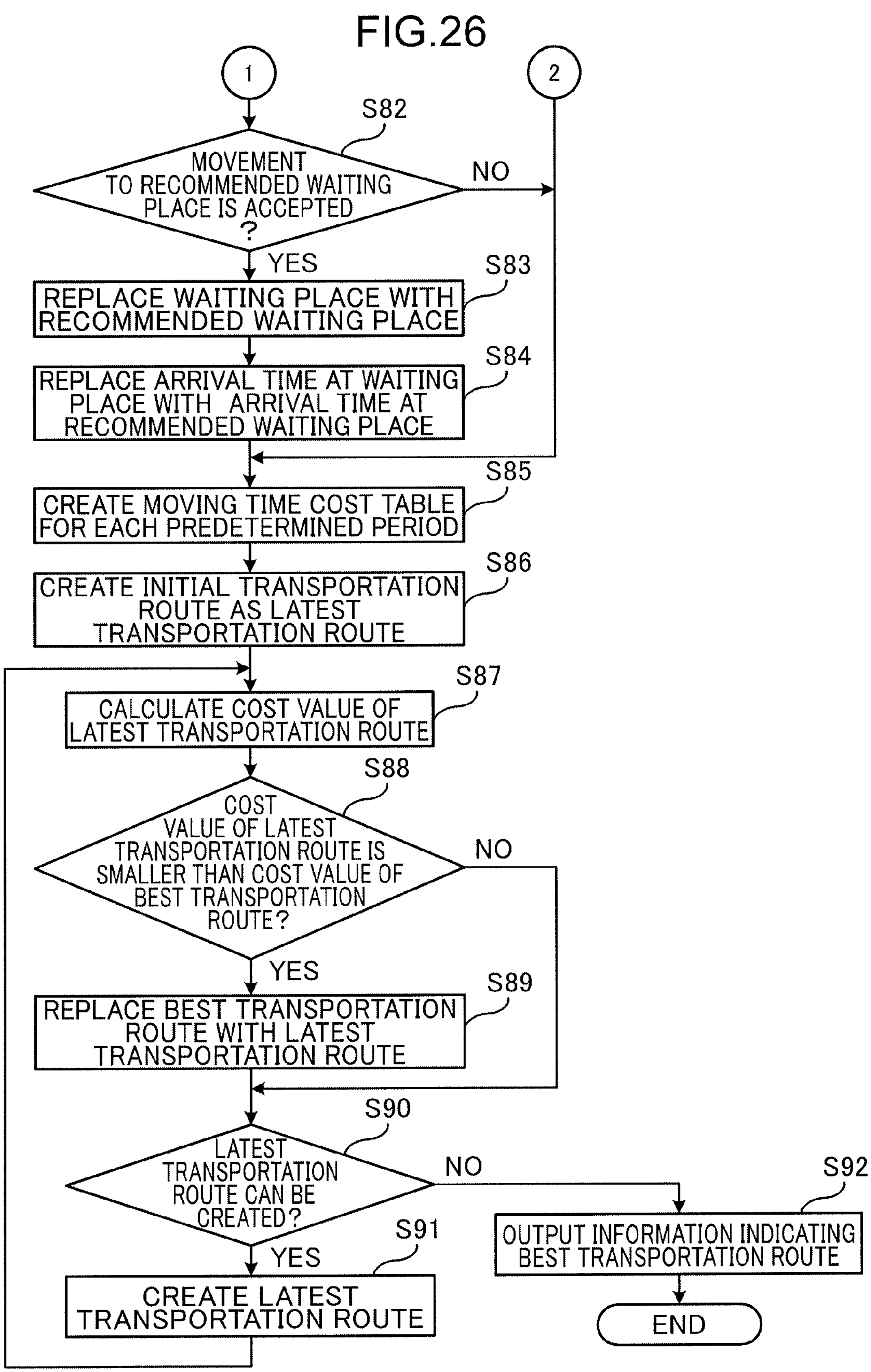
FIG. 26 is a second flowchart for illustrating the transportation route creation processing of the server according to the fourth embodiment of the present disclosure.

FIG. 25 is a first flowchart for illustrating the transportation route creation processing of the server 2C according to the fourth embodiment of the present disclosure. FIG. 26 is a second flowchart for illustrating the transportation route creation processing of the server 2C according to the fourth embodiment of the present disclosure.

Processing in steps S71 to S73 is the same as the processing in steps S21 to S23 illustrated in FIG. 12, and thus description thereof will be omitted.

In subsequent step S74, the recommended waiting place information acquisition unit 217 acquires at least one recommended waiting place within a predetermined distance from the waiting place of the passenger from the recommended waiting place information storage unit 226.

In subsequent step S75, the environmental information acquisition unit 212C acquires environmental information indicating environment of the at least one recommended waiting place at predetermined time intervals acquired by the recommended waiting place information acquisition unit 217 from the external server.

In subsequent step S76, the environmental nonconformity value calculator 213C calculates environmental nonconformity values at the at least one recommended waiting place at the predetermined time intervals based on the environmental information at the predetermined time intervals acquired by the environmental information acquisition unit 212C.

Although the environmental information acquisition unit 212C acquires the environmental information on the current waiting place at the predetermined time intervals and the environmental information on the at least one recommended waiting place at the predetermined time intervals in individual steps, the present disclosure is not particularly limited thereto, and the environmental information on the current waiting place at the predetermined time intervals and the environmental information on the at least one recommended waiting place at the predetermined time intervals may be acquired in one step. Similarly, the environmental nonconformity value calculator 213C may calculate the environmental nonconformity values at the current waiting place at the predetermined time intervals and the environmental nonconformity values at the at least one recommended waiting place at the predetermined time intervals in one step.

In subsequent step S77, the environmental nonconformity improvement value calculator 218C calculates an environmental nonconformity improvement value of at least one type to be improved by moving from the current waiting place to each of the at least one recommended waiting place based on an environmental nonconformity value at a current time among environmental nonconformity values at the current waiting place at predetermined time intervals, an environmental nonconformity value of at least one type at a scheduled arrival time of a passenger among environmental nonconformity values at the at least one recommended waiting place at predetermined time intervals, and a moving time from the current waiting place to the at least one recommended waiting place. The environmental nonconformity improvement value calculator 218C calculates the environmental nonconformity improvement value of the at least one type by using Equation (5). The environmental nonconformity improvement value calculator 218C also stores the calculated environmental nonconformity improvement value of the at least one type in the environmental nonconformity improvement value storage unit 227.

Processing in steps S78 to S84 is the same as the processing in steps S48 to S54 illustrated in FIGS. 19 and 20, and thus description thereof will be omitted.

When multiple passengers request dispatch, the processing in steps S71 to S84 is performed on each of the multiple passengers.

In subsequent step S85, the moving time calculator 214C calculates moving times of all combinations of the waiting place acquired by the passenger information acquisition unit 211 or the recommended waiting place specified by the recommended waiting place specifying unit 219, the destination place, and the current position of the on-demand vehicle, the moving times being calculated for each predetermined period, and creates a moving time cost table for each predetermined period, in which the calculated moving times of all the combinations for each predetermined period are represented in a table format.

Processing in steps S86 to S92 is the same as the processing in steps S25 to S31 illustrated in FIG. 12, and thus description thereof will be omitted.

As described above, the environment of the waiting place and the recommended waiting place may change as time elapses. Thus, the environmental information on the current waiting place and the at least one recommended waiting place at the predetermined time intervals is acquired, and the environmental nonconformity values at the current waiting place and the at least one recommended waiting place at the predetermined time intervals are each calculated based on the environmental information at the predetermined time intervals. Then, the recommended waiting place in environment improved from the environment of the current waiting place is specified, and the specified recommended waiting place is presented to the passenger. Subsequently, when the response information indicating acceptance of the movement to the recommended waiting place is received, the waiting time is weighted using the average value of the environmental nonconformity values in the period from the time when the passenger arrives at the recommended waiting place to the time when the on-demand vehicle arrives at the recommended waiting place, and thus the transportation route can be calculated in consideration of the environment of the recommended waiting place that changes at the predetermined time intervals.

In each of the above embodiments, each component may be implemented by being configured with dedicated hardware or by executing a software program suitable for each component. Each component may be implemented by a program execution unit such as a CPU or a processor reading and executing a software program recorded on a recording medium such as a hard disk or a semiconductor memory. Alternatively, the program may be executed by another independent computer system by recording and transferring the program on a recording medium or transferring the program via a network.

Some or all of the functions of the devices according to the embodiments of the present disclosure are implemented as large scale integration (LSI), which is typically an integrated circuit. These may be individually integrated into one chip, or may be integrated into one chip so as to include some or all of the functions. The integrated circuit is not limited to the LSI, and may be implemented by a dedicated circuit or a general purpose processor. A field programmable gate array (FPGA) that can be programmed after manufacturing of LSI or a reconfigurable processor in which connections and settings of circuit cells inside LSI can be reconfigured may be used.

Some or all of the functions of the devices according to the embodiments of the present disclosure may be implemented by execution of a program by a processor such as a CPU.

The numbers used above are merely examples for specifically describing the present disclosure, and the present disclosure is not limited to the illustrated numbers.

The flowcharts above each illustrate the steps to be performed in order as an example for specifically describing the present disclosure, so that the steps may be performed in order different from the order above as long as the effect of the present disclosure can be similarly obtained. Some of the above steps may be performed simultaneously (concurrently) with another step.

The technique according to the present disclosure enables creating a transportation route in consideration of environment of a waiting place where a passenger waits, so that the technique according to the present disclosure is useful as a technique for creating a transportation route of a mobile body that transports a passenger.

The invention claimed is:

1. An information processing method comprising, by a computer:

acquiring a waiting place of a passenger, a destination place of the passenger, and environmental information indicating environment of the waiting place;

calculating an environmental nonconformity value indicating an index of a discomfort level of environment at the waiting place for the passenger based on the environmental information of the waiting place, the environmental nonconformity value increasing as the discomfort level increases;

creating a transportation route of a mobile body on which the passenger rides, wherein the transportation route comprises a route from the passenger's waiting place to the destination place, the route being generated by a server to account for a moving time, a waiting time, and environmental conditions of the waiting place thereby minimizing a sum of the waiting time of the passenger at the waiting place, the waiting time being multiplied by the environmental nonconformity value, and the moving time of the passenger to move from the waiting place at which the passenger rides on the mobile body to the destination place;

outputting information indicating the transportation route; and controlling the mobile body to follow the transportation route calculated by the server, wherein the server transmits the information indicating the transportation route to the mobile body, and the mobile body moves according to the received transportation route.

2. The information processing method according to claim 1, wherein the environmental information includes at least one of temperature, humidity, weather, and concentration of fine particulate matter at the waiting place.

3. The information processing method according to claim 1, wherein in the acquiring of the environmental information, the environmental information is acquired at predetermined time intervals, in the calculating of the environmental nonconformity value, environmental nonconformity values are calculated at the predetermined time intervals based on the environmental information at the predetermined time intervals, and in the creating of the transportation route, a predicted average value of the environmental nonconformity values that chronologically change in a predicted period from a time when the passenger arrives at the waiting place to a time when the mobile body arrives at the waiting place is calculated based on the environmental nonconformity values at the predetermined time intervals to create the transportation route to minimize a sum of the waiting time multiplied by the predicted average value of the environmental nonconformity values and the moving time.

4. An information processing method comprising, by a computer:

acquiring a waiting place of a passenger, a destination place of the passenger, and environmental information indicating environment of the waiting place;

calculating an environmental nonconformity value indicating an index of a discomfort level of environment at the waiting place for the passenger based on the environmental information of the waiting place, the environmental nonconformity value increasing as the discomfort level increases;

acquiring information of at least one recommended waiting place within a predetermined distance from the waiting place;

acquiring environmental information of the at least one recommended waiting place;

calculating an environmental nonconformity value of the at least one recommended waiting place based on the environmental information of the at least one recommended waiting place;

calculating at least one environmental nonconformity improvement value improved by moving from the waiting place to the at least one recommended waiting place based on the environmental nonconformity value of the waiting place, the environmental nonconformity value of the at least one recommended waiting place, and a moving time from the waiting place to the at least one recommended waiting place;

specifying a recommended waiting place corresponding to an environmental nonconformity improvement value that is equal to or more than a threshold and is maximum among environmental nonconformity improvement values;

transmitting presentation information for prompting the passenger to move to the specified recommended waiting place;

creating the transportation route to minimize a sum of the waiting time of the passenger at the specified recommended waiting place, the waiting time being multiplied by the environmental nonconformity value of the specified recommended waiting place, and a moving time of the passenger to move from the specified recommended waiting place at which the passenger rides on the mobile body to the destination place, when response information indicating acceptance of the movement to the specified recommended waiting place is received in response to the presentation information, wherein the transportation route comprises a route from the specified recommended waiting place to the destination place, the route being generated by a server to account for the moving time, the waiting time, and environmental conditions at the specified recommended waiting place;

outputting information indicating the transportation route; and controlling the mobile body to follow the transportation route calculated by the server, wherein the server transmits information indicating the transportation route to the mobile body, and the mobile body moves according to the received transportation route.

5. The information processing method according to claim 4, wherein in the creating of the transportation route, the transportation route is calculated to minimize a sum of the waiting time of the passenger at the waiting place, the waiting time being multiplied by the environmental nonconformity value of the waiting place, and the moving time of the passenger to move from the waiting place at which the passenger rides on the mobile body to the destination place, when the response information indicating non-acceptance of the movement to the specified recommended waiting place is received in response to the presentation information.

6. The information processing method according to claim 4, wherein in the acquiring of the environmental information of the waiting place, the environmental information of the waiting place at predetermined time intervals is acquired, in the acquiring of the environmental information of the at least one recommended waiting place, the environmental information of the at least one recommended waiting place at the predetermined time intervals is acquired, in the calculating of the environmental nonconformity value at the waiting place, the environmental nonconformity value at the waiting place at the predetermined time intervals is calculated based on the environmental information of the waiting place at the predetermined time intervals, in the calculating of the environmental nonconformity value of the at least one recommended waiting place, at least one environmental nonconformity value at the at least one recommended waiting place at the predetermined time intervals is calculated based on the environmental information on the at least one recommended waiting place at the predetermined time intervals, in the calculating of the at least one environmental nonconformity improvement value, at least one environmental nonconformity improvement value to be improved by moving from the waiting place to the at least one recommended waiting place is calculated based on the environmental nonconformity value at a current time among environmental nonconformity values at the waiting place at the predetermined time intervals, the at least one environmental nonconformity value at a scheduled arrival time of the passenger among environmental nonconformity values at the at least one recommended waiting place at the predetermined time intervals, and a moving time from the waiting place to the at least one recommended waiting place, and in the creating of the transportation route, when response information indicating acceptance of movement to the specified recommended waiting place is received in response to the presentation information, a precited average value of the environmental nonconformity values in a predicted period from time when the passenger arrives at the specified recommended waiting place to time when the mobile body arrives at the specified recommended waiting place is calculated based on the environmental nonconformity value of the specified recommended waiting place at the predetermined time intervals to create the transportation route to minimize a sum of the waiting time of the passenger at the specified recommended waiting place, the waiting time being multiplied by the predicted average value of the environmental nonconformity values at the specified recommended waiting place, and a moving time of the passenger to move from the specified recommended waiting place at which the passenger rides on the mobile body to the destination place.

7. An information processing device comprising:

a processor; and a memory operatively connected to the processor, the memory storing computer readable instructions, when executed, cause the processor to:

acquire a waiting place of a passenger, a destination place of the passenger, and environmental information indicating environment of the waiting place;

calculate an environmental nonconformity value indicating an index of a discomfort level of environment at the waiting place for the passenger based on the environmental information of the waiting place, the environmental nonconformity value increasing as the discomfort level increases;

create a transportation route of a mobile body on which the passenger rides wherein the transportation route comprises a route from the passenger's waiting place to the destination place, the route being generated by a server to account for a moving time, a waiting time, and environmental conditions at the waiting place thereby minimizing a sum of the waiting time of the passenger at the waiting place, the waiting time being multiplied by the environmental nonconformity value, and the moving time of the passenger to move from the waiting place at which the passenger rides on the mobile body to the destination place;

output information indicating the transportation route; and control the mobile body to follow the transportation route calculated by the server, wherein the server transmits information indicating the transportation route to the mobile body, and the mobile body moves according to the received transportation route.

8. A non-transitory computer readable recording medium storing an information processing program causing a computer to execute processing of:

acquiring a waiting place of a passenger, a destination place of the passenger, and environmental information indicating environment of the waiting place;

calculating an environmental nonconformity value indicating an index of a discomfort level of environment at the waiting place for the passenger based on the environmental information of the waiting place, the environmental nonconformity value increasing as the discomfort level increases;

creating a transportation route of a mobile body on which the passenger rides wherein the transportation route comprises a route from the passenger's waiting place to the destination place, the route being generated by a server to account for a moving time, a waiting time, and environmental conditions at the waiting place thereby minimizing a sum of the waiting time of the passenger at the waiting place, the waiting time being multiplied by the environmental nonconformity value, and the moving time of the passenger to move from the waiting place at which the passenger rides on the mobile body to the destination place;

outputting information indicating the transportation route; and controlling the mobile body to follow the transportation route calculated by the server, wherein the server transmits information indicating the transportation route to the mobile body, and the mobile body moves according to the received transportation route.

* * * * *